United States Patent
Hikosaka et al.

(10) Patent No.: US 7,888,455 B2
(45) Date of Patent: Feb. 15, 2011

(54) POLYCARBONATE COPOLYMER, METHOD FOR PRODUCING THE SAME, MOLDED BODY, OPTICAL MATERIAL, AND ELECTROPHOTOGRAPHIC PHOTOSENSITIVE BODY

(75) Inventors: Takaaki Hikosaka, Chiba (JP); Yasushi Hamada, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/853,727

(22) Filed: Aug. 10, 2010

(65) Prior Publication Data

US 2010/0324209 A1   Dec. 23, 2010

Related U.S. Application Data

(62) Division of application No. 12/375,451, filed on Jan. 28, 2009.

(51) Int. Cl.
  C08F 6/00   (2006.01)
  C08J 3/00   (2006.01)

(52) U.S. Cl. .................. 528/480; 430/58.25; 528/219; 528/220; 528/310; 528/417

(58) Field of Classification Search ............. 430/58.25; 528/219, 220, 310, 417
See application file for complete search history.

(56) References Cited

U.S. PATENT DOCUMENTS

| | | | |
|---|---|---|---|
| 3,410,823 | A | 11/1968 | Cleveland |
| 4,985,326 | A | 1/1991 | Sakamoto |
| 5,401,826 | A | 3/1995 | Sakashita et al. |
| 2009/0185363 | A1* | 7/2009 | Ishikawa .................. 362/97.1 |
| 2009/0186208 | A1* | 7/2009 | Ishikawa et al. ............ 428/220 |
| 2009/0326184 | A1* | 12/2009 | Hikosaka et al. ............ 528/219 |
| 2010/0047703 | A1* | 2/2010 | Tajima .................... 430/58.25 |
| 2010/0190953 | A1* | 7/2010 | Fuji et al. .................. 528/370 |

FOREIGN PATENT DOCUMENTS

| | | |
|---|---|---|
| EP | 0 866 083 | 9/1998 |
| EP | 1 566 396 | 8/2005 |
| JP | 1226841 | 9/1989 |
| JP | 02048543 | 2/1990 |
| JP | 2225433 | 9/1990 |
| JP | 5-70582 | 3/1993 |
| JP | 5-70583 | 3/1993 |
| JP | 5-72424 | 3/1993 |
| JP | 0632884 | 2/1994 |
| JP | 5117382 | 5/1994 |

(Continued)

OTHER PUBLICATIONS

European Search Report corresponding to European patent application No. 07830076.1, dated Sep. 20, 2010.
Office Action, Notification of Reasons for Rejection of corresponding application No. JP 2007-271672, dated Aug. 18, 2009.

(Continued)

*Primary Examiner*—Terressa M Boykin
(74) *Attorney, Agent, or Firm*—Millen, White, Zelano & Branigan, P.C.

(57) ABSTRACT

A polycarbonate copolymer contains: 0.1 to 50 mol % of a monomer unit represented by the following formula (1); and a monomer unit represented by the following formula (2). In the polycarbonate copolymer, the content of biphenols having a structure represented by the following formula (3) is 90 mass ppm or less.

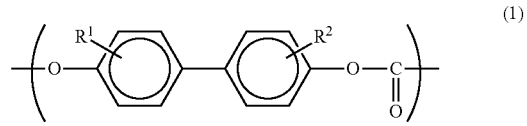

(1)

In the formula, $R^1$ and $R^2$ each independently represent a hydrogen atom, an aliphatic hydrocarbon group having 1 to 6 carbon atoms, an aryl group having 6 to 12 carbon atoms or a halogen atom.

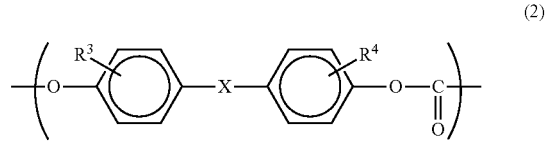

(2)

In the formula: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO$_2$—, —CO— and 9,9-fluorenylidene group.

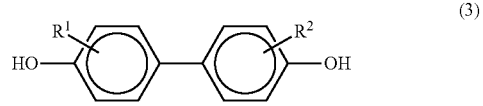

(3)

In the formula, $R^1$ and $R^2$ each independently represent a hydrogen atom, an aliphatic hydrocarbon group having 1 to 6 carbon atoms, an aryl group having 6 to 12 carbon atoms or a halogen atom.

22 Claims, No Drawings

FOREIGN PATENT DOCUMENTS

| | | |
|---|---|---|
| JP | 06136109 | 5/1994 |
| JP | 2006-505652 | 9/1994 |
| JP | 692480 | 11/1994 |
| JP | 08-41303 | 2/1996 |
| JP | 2531852 | 6/1996 |
| JP | 9204053 | 8/1997 |
| JP | 11-172003 | 6/1999 |
| JP | 2001-337466 | 12/2001 |
| JP | 2002/249577 | 9/2002 |
| JP | 06248066 | 9/2002 |
| JP | 2002-533544 | 10/2002 |
| JP | 2004-75799 | 3/2004 |
| JP | 2005-082677 | 3/2005 |
| JP | 2006-39482 | 2/2006 |
| JP | 2006/267886 | 10/2006 |
| WO | WO 2005/113638 | 12/2005 |
| WO | WO 2007/123162 | 11/2007 |
| WO | WO 2008/050669 | 5/2008 |

OTHER PUBLICATIONS

Office Action for corresponding Japanese Patent Application No. 2007-271669, dated Nov. 17, 2009.

Office Action for corresponding Japanese Patent Application No. 2007-271670, dated Nov. 17,2009.

Mitsubishi Gas Chem Co Inc., Patent Abstracts of Japan, "Manufacturing Method of Aromatic Series-Aliphatic Series Copolycarbonate", Pub. No. 2002-249577, dated Sep. 6, 2002.

International Preliminary Report on Patentability, International Application No. PCT/JP2007/070342, filed Oct. 18, 2007.

Office Action for corresponding Japanese Patent Application No. 2007-271672, dated Aug. 18, 2009.

Office Action for corresponding Japanese Patent Application No. 2007-271669, dated Jun. 30, 2009.

* cited by examiner

POLYCARBONATE COPOLYMER, METHOD FOR PRODUCING THE SAME, MOLDED BODY, OPTICAL MATERIAL, AND ELECTROPHOTOGRAPHIC PHOTOSENSITIVE BODY

TECHNICAL FIELD

The present invention relates to a polycarbonate copolymer, a method of manufacturing the same, a molding formed of the copolymer, an optical material and an electrophotographic photoreceptor.

BACKGROUND ART

Polycarbonate resins (hereinafter also referred to as "PC resin") made of 2,2-bis(4-hydroxyphenyl) propane (commonly known as bisphenol A) exhibit high transparency and excellent mechanical characteristics. Such polycarbonate resins have been conventionally put into various uses such as use in optical materials and use in electronic materials. However, as PC resins are put in more increasing use, more advanced performance has been demanded on PC resins. PC resins having more excellent performance are being demanded. For instance, PC resins for use in electrophotographic photoreceptors are demanded to have not only higher mechanical characteristics but also higher transparency, more stable electrostatic characteristics so as to be more invulnerable to repeated cycle of electrification and neutralization or more favorable solubility in non-halogen solvents.

For such demands, a Patent Document 1, for example, discloses a method of obtaining a polycarbonate copolymer (hereinafter also referred to as "copolymerized PC") capable of exerting excellent heat resistance without deterioration in transparency by performing polycondensation with use of a material in which a bisphenol A and a specific bisphenol are mixed as phenol structural unit. In addition, a technique for applying such copolymers to electrophotographic photoreceptors is also known (e.g., Patent Document 2).

Other examples of known techniques are a technique for obtaining a polycarbonate copolymer having YI of approximately 1.3 to 1.4 (e.g., Patent Document 3) and a technique for obtaining polycarbonate having low yellow index (YI) by controlling an amount of oxygen dissolved in a sodium bisphenolate solution to be less than 150 ppb (e.g., Patent Document 4).

A further example of known methods is a method of obtaining a polycarbonate copolymer having favorable hue by using fluorene-base bisphenol under substantially no presence of oxygen (e.g., Patent Document 5).

| Patent Document 1: | Japanese Patent No. 1965051 |
| Patent Document 2: | Japanese Patent No. 2531852 |
| Patent Document 3: | JP-A-5-117382 |
| Patent Document 4: | JP-T-2002-533544 |
| Patent Document 5: | JP-A-2005-82677 |

DISCLOSURE OF THE INVENTION

Problems to Be Solved by the Invention

However, according to the techniques disclosed in the patent documents 1 and 2, since a biphenol skeleton is included, the polycarbonate copolymer after the polymerization and also the polycarbonate copolymer after molding may be colored as compared with a bisphenol-A-type PC resin. Such coloration is problematic when the polycarbonate copolymer is applied to an optical material, i.e., a material for which transparency is important. In addition, many of such colored copolymers bring influence on electrostatic characteristics. Particularly when such a copolymer is applied to an electrophotographic photoreceptor, residual potential of the electrophotographic photoreceptor after repeated use tends to be increased.

When such a polycarbonate copolymer obtained through melt copolycondensation as disclosed in the patent document 3 is concerned, impurities may not be easily eliminated. The patent document 4 discloses a polycarbonate in which bisphenol A is singularly used among biphenols, but does not disclose any particular system for conducting copolycondensation. Since behaviors of coloration are totally different depending on types of comonomer to be copolycondensed with bisphenol A, the technique disclosed in the patent document 4 is not easily applicable to polymerization management of the polycarbonate copolymer.

According to the patent document 5, when a polycarbonate copolymer is manufactured under no presence of oxygen, concentration of oxygen in gas phase and liquid phase is required to be 0.5 mass ppm or less. Thus, facilities suited for such purpose may be required, and the technique disclosed therein is not an easy or convenient method.

An object of the invention is to provide a polycarbonate copolymer that exhibits: less coloration not only after polymerization but also after molding; and excellent electrostatic characteristics, a molding formed of the copolymer, an optical material and an electrophotographic photoreceptor.

Means for Solving the Problems

A polycarbonate copolymer according to an aspect of the invention contains: 0.1 to 50 mol % of a monomer unit represented by a formula (1) as follows; and a monomer unit represented by a formula (2) as follows, in which a content of biphenols having a structure represented by a formula (3) as follows is 90 mass ppm or less.

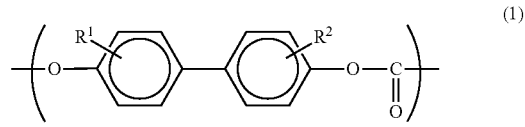

In the formula, $R^1$ and $R^2$ each independently represent a hydrogen atom, an aliphatic hydrocarbon group having 1 to 6 carbon atoms, an aryl group having 6 to 12 carbon atoms or a halogen atom.

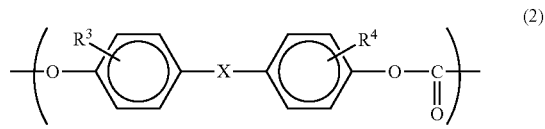

In the formula: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO₂—, —CO—, 9,9-fluorenylidene group and formulae (2a), (2b) (2c) and (2d) as follow.

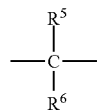

(2a)

In the formula, $R^5$ and $R^6$ each independently represent a hydrogen atom, an aliphatic hydrocarbon group having 1 to 6 carbon atoms or an aryl group having 6 to 12 carbon atoms. $R^5$ and $R^6$ may be bonded together to form a cycloalkylidene group having 4 to 12 carbon atoms.

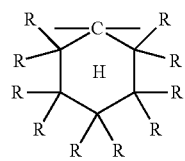

(2b)

In the formula, R represents a hydrogen atom or an alkyl group having 1 to 3 carbon atoms. In addition, at least one of R representing an alkyl group having 1 to 3 carbon atoms, preferably three of R each representing an alkyl group having 1 to 3 carbon atoms.

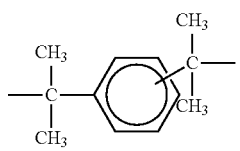

(2c)

In the formula, a bonding position may be any one of o-, m- and p-.

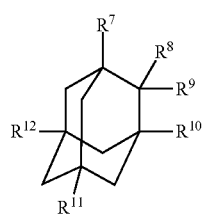

(2d)

In the formula, $R^7$ to $R^{12}$ each independently represent a hydrogen atom, an alkyl group having 1 to 4 carbon atoms, or a single bonding or a bonding group formed of an alkylene group on a condition that two of $R^7$ to $R^{12}$ each represent a bonding group while the rest of $R^7$ to $R^{12}$ each represent a hydrogen atom or an alkyl group having 1 to 4 carbon atoms.

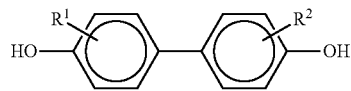

(3)

In the formula, $R^1$ and $R^2$ each independently represent a hydrogen atom, an aliphatic hydrocarbon group having 1 to 6 carbon atoms, an aryl group having 6 to 12 carbon atoms or a halogen atom.

In the copolymerized PC according to the aspect of the invention, the content of biphenols represented by the formula (3) (i.e., a commencing material of the monomer unit represented by the formula (1)) is 90 mass ppm or less. Thus, the copolymerized PC exhibits less initial coloration and also exhibits less coloration at the time of melt molding. When the copolymerized PC according to the aspect of the invention is molded into a molding for use in electrophotographic photoreceptors while the content of biphenols is 90 mass ppm or less, increase in residual potential of the electrophotographic photoreceptors after repeated use can be restrained.

In the aspect of the invention, the content of biphenols represented by the formula (3) corresponds to an amount of unreacted biphenols remaining in the copolymerized PC after polycondensation. The content is preferably 60 mass ppm or less, more preferably 30 mass ppm or less and the most preferably 10 mass ppm or less.

A polycarbonate copolymer according to another aspect of the invention contains: 0.1 to 50 mol % of a monomer unit represented by the formula (1); and a monomer unit represented by the formula (2), in which a content of a biphenyl compound having three phenolic hydroxyl groups in one molecule is 200 mass ppb or less.

In the copolymerized PC according to the aspect of the invention, the content of a biphenyl compound having three phenolic hydroxyl groups in one molecule (hereinafter referred to as trihydroxy biphenyls) is 200 mass ppb or less. Thus, the copolymerized PC exhibits less initial coloration and also exhibits less coloration at the time of melt molding. When the copolymerized PC according to the aspect of the invention is molded into a molding usable for electrophotographic photoreceptors while the content of trihydroxy biphenyls is 200 mass ppb or less, increase in residual potential of the electrophotographic photoreceptors after repeated use can be restrained.

In the aspect of the invention, the content of trihydroxy biphenyls in the copolymerized PC is preferably 150 mass ppb or less, more preferably 100 mass ppb or less and the most preferably 50 mass ppb or less.

A polycarbonate copolymer according to a still further aspect of the invention is a polycarbonate copolymer obtained through polymerization conducted in a biphasic solvent under the presence of a phase transfer catalyst, the biphasic solvent containing: a solvent in which 5 mass % or more of a finally-obtained polycarbonate copolymer is soluble, the solvent being substantially non-miscible with water; and an aqueous solution in which alkaline metal hydroxide or alkaline earth metal hydroxide is dissolved, the polycarbonate copolymer containing: 0.1 to 50 mol % of a monomer unit represented by the formula (1); and a monomer unit represented by the formula (2), in which YI of the polycarbonate copolymer is 3 or less, the YI being obtained by measuring flake powder based on JIS K 7105.

In the copolymerized PC according to the aspect of the invention, the content of the monomer unit represented by the formula (1) is 0.1 to 50 mol % and YI of the polycarbonate copolymer (obtained by measuring flake powder of the copolymer based on JIS K 7105) is 3 or less. Thus, the copolymerized PC is favorably applicable to optical materials, for which colorless transparency is important as well as heat resistance. YI of the flake powder being 3 or less also means that an amount of impurities that may deteriorate electrostatic characteristics is small. Thus, the copolymerized PC is also a useful material of a molding usable for electrophotographic photoreceptors.

However, when the content of the monomer unit represented by the formula (1) is less than 0.1 mol %, heat resistance of the copolymerized PC is not enhanced. In addition, when the copolymerized PC whose content of the monomer unit represented by the formula (1) is 0.1 mol % or less is applied to the outermost layer of an electrophotographic photoreceptor, sufficient wear resistance is not obtained, so that durability of the electrophotographic photoreceptor is insufficient. On the other hand, when the content of the monomer unit represented by the formula (1) is more than 50 mol %, the biphenol skeleton thereof is easily crystallized and transparency is deteriorated. In addition, if such a crystal is generated in a photosensitive layer of the electrophotographic photoreceptor, electrostatic characteristics are deteriorated. The content of the monomer unit represented by the formula (1) is preferably in a range of 1 to 40 mol %, more preferably in a range of 5 to 30 mol %.

A polycarbonate copolymer according to a still further aspect of the invention is a polycarbonate copolymer formed through polycondensation of a monomer represented by the formula (3) and a monomer represented by a formula (4) as follows, in which a content of a biphenyl compound having three phenolic hydroxyl groups in one molecule (hereinafter referred to as "trihydroxy biphenyls") in the monomer represented by the formula (3) (hereinafter referred to as "biphenol monomer") is 300 mass ppm or less.

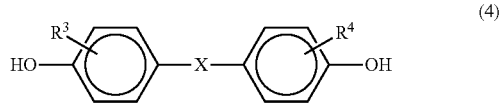
(4)

In the formula: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO$_2$—, —CO—, 9,9-fluorenylidene group and the above formulae (2a), (2b) (2c) and (2d).

In the copolymerized PC according to the aspect of the invention, the content of trihydroxy biphenyls, which are impurities contained in a biphenol monomer, is 300 mass ppm or less. Thus, flake of the copolymerized PC exhibits little coloration. Accordingly, the copolymerized PC is favorably applicable to optical materials, for which colorless transparency is important as well as heat resistance. In addition, since a smaller amount of trihydroxy biphenyls detrimental for electrostatic characteristics is residual therein, the copolymerized PC is also a useful material of a molding usable for electrophotographic photoreceptors. The content of trihydroxy biphenyls in the biphenol monomer is preferably 150 mass ppm or less, more preferably 20 mass ppm or less, the most preferably 10 mass ppm or less.

Preferably in the polycarbonate copolymer according to the aspect of the invention, YI of the polycarbonate copolymer is 3 or less, the YI being obtained by measuring flake based on JIS K 7105.

When the copolymerized PC is obtained as flake powder after polymerization, values obtained by measuring the flake powder may be directly used as values of YI of the copolymerized PC according to the aspect of the invention. Alternatively, when the copolymerized PC is obtained in a form other than flake powder, a sample for measuring YI is prepared as follows.

A solution prepared by dissolving 30 to 70 g of the copolymerized PC in 1 L of methylene chloride is dropped into 2 L of methanol at such a speed as to form flake while being sufficiently stirred. After the entire amount is dropped thereinto, another 2 L of methanol is further added. Solids therein are then extracted while re-fusion thereof is prevented, and flake obtained after sufficient drying is used as a sample for measuring YI. Concentration of the copolymerized PC in the solution of methylene chloride is adjusted within the above concentration range so that flake having a shape suitable for YI measurement is obtained.

According to the aspect of the invention, YI of the copolymerized PC is 3 or less, which is considered to be because less coloring material is contained therein. For instance, when a molding molded of the copolymerized PC is applied to electrophotographic photoreceptors, increase in the residual potential thereof after repeated use can be restrained. In addition, since less coloring material is contained therein, coloration is not further progressed in subsequent molding processes. Thus, the copolymerized PC is a useful material for optical materials, for which transparency is important. YI of the copolymerized PC is preferably 2.3 or less, more preferably 1.8 or less, still more preferably 1.2 or less.

A molding according to a still further aspect of the invention is preferably formed by melt-molding the above-described polycarbonate copolymer.

Since the molding according to the aspect of the invention is formed by melt molding the copolymerized PC, moldings having various shapes can be easily obtained.

Particularly, the moldings formed by melt molding the copolymerized PC whose YI is 3 or less in flake form exhibit less coloration after melt molding. Thus, the moldings are favorably applicable to optical materials.

A molding according to a still further aspect of the invention is preferably formed by wet-molding the above-described polycarbonate copolymer.

Since the molding according to the aspect of the invention is formed by wet molding, discoloration of the molding with the passage of time can be restrained, so that less degradation is brought to quality of the molding.

Particularly when the content of biphenols is 90 ppm or less or the content of trihydroxy biphenyls is 200 ppb or less, degradation due to light, heat, oxidizer, humidity and the like can be restrained. Thus, discoloration of the molding with the passage of time can be restrained, so that less degradation is brought to quality of the molding. In addition, when the molding is applied to electrophotographic photoreceptors, increase in residual potential of the electrophotographic photoreceptors after repeated use can be particularly restrained. Thus, the molding is considerably useful.

Further, when flake of the copolymerized PC exhibits YI of 3 or less, a molding formed of the copolymerized PC is likewise restrained from being discolored with the passage of time. Thus, when the molding is applied to electrophotographic photoreceptors, increase in residual potential of the electrophotographic photoreceptors after repeated use can be particularly restrained. This is presumably because, when the flake of the copolymerized PC is controlled to have YI of 3 or less, a material for changing the color of the copolymerized PC into yellow under the action of light, heat, oxidizer, humidity and the like is contained therein by a relatively small amount.

An optical material according to a still further aspect of the invention contains the above-described polycarbonate copolymer or the molding formed of the copolymer.

Since the optical material according to the aspect of the invention contains the above-described polycarbonate copolymer, the above-described melt molding or the above-described wet molding, the optical material is substantially free from coloration and excellent in transparency. Thus, the optical material is an excellent optical material.

An electrophotographic photoreceptor according to a still further aspect of the invention contains the above-described polycarbonate copolymer or the molding formed of the copolymer.

The electrophotographic photoreceptor herein means, for instance, an electrophotographic photoreceptor in which a photosensitive layer is provided on a conductive substrate. For such an electrophotographic photoreceptor, the above-described copolymerized PC can be favorably used as a binder resin, a surface-coating resin, an adhesive resin or the like.

Since the above-described copolymerized PC is used as, for instance, so-called a binder resin in the electrophotographic photoreceptor according to the aspect of the invention, the electrophotographic photoreceptor exhibits excellent electrostatic characteristics. In particular, since a range within which residual potential of the electrophotographic photoreceptor is increased after repeated use is small, the electrophotographic photoreceptor is considerably useful.

A method of manufacturing a polycarbonate copolymer according to a still further aspect of the invention includes: conducting polycondensation with use of the monomer represented by the formula (3) and the monomer represented by the formula (4); and adding 0.0001 to 1 mol equivalent of an antioxidant to a reaction system per 1 mol of the monomer represented by the formula (3).

In the manufacturing method according to the aspect of the invention, when the copolymerized PC is manufactured with use of a predetermined monomer, 0.0001 to 0.1 mol equivalent of the antioxidant is added to the reaction system per 1 mol of the monomer represented by the formula (3). Thus, side reaction(s) can be restrained, thereby restraining the initial coloration of the obtained copolymerized PC. For instance, YI obtained by measuring flake based on JIS K 7105 can be easily controlled to be 3 or less. In other words, according to the aspect of the invention, even substantially under the presence of oxygen, the copolymerized PC having favorable characteristics can be obtained.

Preferably in the method of manufacturing according to the aspect of the invention, the antioxidant is hydrosulfite salt.

In the manufacturing method according to the aspect of the invention, hydrosulfite salt is used as the antioxidant. Thus, side reaction(s) at the time of polycondensation can be further restrained, thereby more effectively restraining the initial coloration of the obtained copolymerized PC.

Preferably in the method of manufacturing according to the aspect of the invention, a temperature at the time of the polycondensation is 20 degrees C. or less.

In the manufacturing method according to the aspect of the invention, the temperature at the time of polycondensation is 20 degrees C. or less. Thus, the initial coloration of the obtained copolymerized PC can be easily restrained.

Preferably in the method of manufacturing according to the aspect of the invention, the polycondensation is conducted under atmosphere where oxygen partial pressure is 5065 Pa or less.

In the manufacturing method according to the aspect of the invention, the polycondensation is conducted under the atmosphere where the oxygen partial pressure is 5065 Pa or less. Thus, the initial coloration of the obtained copolymerized PC can be easily restrained. The oxygen partial pressure is more preferably 1013 Pa or less.

A polycarbonate copolymer according to a still further aspect of the invention is manufactured by the above-described method of manufacturing.

Since the polycarbonate copolymer according to the aspect of the invention is manufactured by the above-described manufacturing method, the obtained copolymerized PC exhibits considerably less initial coloration. Accordingly, the polycarbonate copolymer is favorably applicable to a field of optical materials, for which transparency is required. In addition, since less impurities are contained in the copolymerized PC and the copolymerized PC is excellent in electrostatic characteristics, the copolymerized PC is favorably applicable to, for instance, a field of electrophotographic photoreceptors.

BEST MODE FOR CARRYING OUT THE INVENTION

Exemplary embodiment(s) of a polycarbonate copolymer (copolymerized PC) according to the aspect of the invention and a manufacturing method of the same will be described in detail below. In addition, exemplary embodiment(s) of an electrophotographic photoreceptor containing a molding in which the copolymerized PC is used as a binder resin will be also described.

First Embodiment

A first exemplary embodiment of the invention will be described in detail below.

[Structure of Copolymerized PC]

A copolymerized PC according to this embodiment is a polycarbonate copolymer that contains: 0.1 to 50 mol % of a monomer unit represented by the following formula (1); and a monomer unit represented by the following formula (2), in which the content of biphenols having a structure represented by the following formula (3) is 90 mass ppm or less.

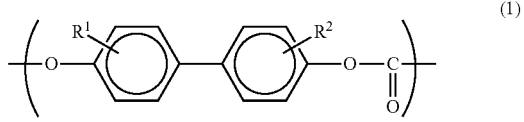

In the formula, $R^1$ and $R^2$ each independently represent a hydrogen atom, an aliphatic hydrocarbon group having 1 to 6 carbon atoms, an aryl group having 6 to 12 carbon atoms or a halogen atom.

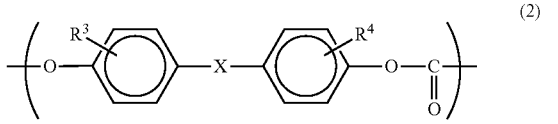

(2)

In the formula: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO$_2$—, —CO—, 9,9-fluorenylidene group and the following formulae (2a), (2b) (2c) and (2d).

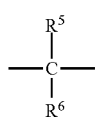

(2a)

In the formula, $R^5$ and $R^6$ each independently represent a hydrogen atom, an aliphatic hydrocarbon group having 1 to 6 carbon atoms or an aryl group having 6 to 12 carbon atoms. In addition, $R^5$ and $R^6$ may be bonded together to form a cycloalkylidene group having 4 to 12 carbon atoms.

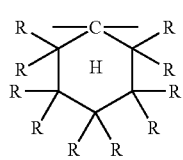

(2b)

In the formula, R represents a hydrogen atom or an alkyl group having 1 to 3 carbon atoms. At least one of R represents an alkyl group having 1 to 3 carbon atoms, and preferably three of R each represent an alkyl group having 1 to 3 carbon atoms.

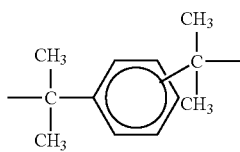

(2c)

n the formula, a bonding position may be any one of o-, m- and p-.

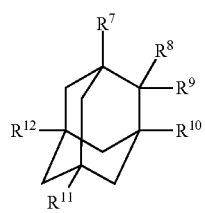

(2d)

In the formula, $R^7$ to $R^{12}$ each independently represent a hydrogen atom, an alkyl group having 1 to 4 carbon atoms, or a single bonding or a bonding group formed of an alkylene group. However, two of $R^7$ to $R^{12}$ each represent a bonding group while the rest of $R^7$ to $R^{12}$ each represent a hydrogen atom or an alkyl group having 1 to 4 carbon atoms.

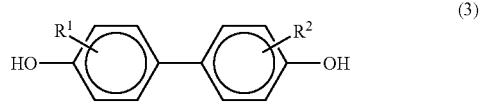

(3)

In the formula, $R^1$ and $R^2$ each independently represent a hydrogen atom, an aliphatic hydrocarbon group having 1 to 6 carbon atoms, an aryl group having 6 to 12 carbon atoms or a halogen atom.

A plurality of substituents, which are equivalent to $R^1$, $R^2$, $R^3$ and $R^4$, may be bonded to a single benzene ring. The bonded substituents may be mutually the same or different.

When the monomer unit represented by the formula (1) is contained by a ratio of 0.1 mol % or less, the biphenol skeleton may not provide a modification effect, so that heat resistance may be insufficient or that a coating agent at the time of wet molding may be whitened (gelled). In addition, when such a copolymerized PC is used as the molding (binder resin) applied to electrophotographic photoreceptors, crystallization of a charge transporting layer may not be easily prevented, or printing-proof life may not be easily enhanced. On the other hand, when the ratio of the monomer unit is more than 50 mol %, a part of the copolymerized PC (biphenol skeleton) may be easily crystallized, thereby deteriorating transparency. Thus, such a copolymerized PC is not suitably applicable as a binder resin for electrophotographic photoreceptors. For instance, when an amount of transmitted light is reduced, sensitivity of electrophotographic photoreceptors is reduced. In addition, when haze is great, image blurring may unfavorably occur.

The content of the monomer unit represented by the formula (1) is preferably in a range of 1 to 40 mol %, more preferably in a range of 5 to 30 mol %.

In this exemplary embodiment, the content of biphenols represented by the formula (3) (i.e., a commencing material of the monomer unit represented by the formula (1)) in the copolymerized PC is 90 mass ppm or less. Thus, the copolymerized PC exhibits less initial coloration and also exhibits less coloration at the time of melt molding. When the copolymerized PC is molded into a molding usable for electrophotographic photoreceptors while the content of biphenols is 90 mass ppm or less, increase in residual potential of the electrophotographic photoreceptors after repeated use can be restrained.

The content of the biphenols corresponds to an amount of biphenols remaining unreacted after polycondensation. The content is more preferably 60 mass ppm or less, further preferably 30 mass ppm or less and the most preferably 10 mass ppm or less.

In a solution where the copolymerized PC according to this exemplary embodiment is dissolved in a solvent of methylene chloride at a concentration of 0.5 g/dl, the copolymerized PC preferably exhibits reduced viscosity [$\eta_{sp}$/C] at 20 degrees C. in a range of 0.2 to 5.0 dl/g. When the reduced viscosity [$\eta_{sp}$/C] is less than 0.2 dl/g, mechanical strength of the copolymerized PC is low. Particularly when such a copolymerized PC is exemplarily applied as a binder resin for electrophotographic photoreceptors, surface hardness of the binder layer may be so insufficient that the photoreceptors may be worn and the printing-proof life thereof may be shortened. Thus, such a copolymerized PC is practically disadvantageous. On the other hand, when the reduced viscosity [$\eta_{sp}/C$] is more than 5.0 dl/g, solution viscosity of the copolymerized PC may be so increased that the photoreceptors may not be easily manufactured by solution coating.

As long as an object of the invention is not hampered, the copolymerized PC according to this embodiment may contain a monomer unit other than the above, or may be suitably added in use with other polycarbonate components or additives.

[Manufacturing Method of Copolymerized PC]

The copolymerized PC according to this exemplary embodiment can be easily obtained in a form of flake powder by conducting polycondensation with use of a mixture monomer in which the monomer represented by the formula (3) and a monomer represented by the following formula (4) are mixed together.

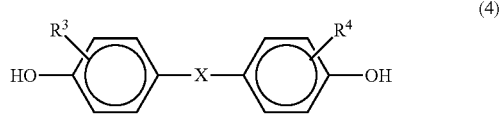

(4)

In the formula: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO$_2$—, —CO—, 9,9-fluorenylidene group and the formulae (2a), (2b) (2c) and (2d).

Examples of the monomer (biphenols) represented by the formula (3) are 4,4'-biphenol, 3,3'-dimethyl-4,4'-biphenol, 3,3',5-trimethyl-4,4'-biphenol, 3-propyl-4,4'-biphenol, 3,3', 5,5'-tetramethyl-4,4'-biphenol, 3,3'-diphenyl-4,4'-biphonol, and 3,3'-dibutyl-4,4'-biphenol. Among the above, 4,4'-biphenol is preferable in that less colored copolymerized PC is provided. In addition, when 4,4-biphenol is applied to a copolymerized PC for electrophotographic photoreceptors, durability thereof is enhanced. One of the above may be singularly used, or two or more of the above may be used together.

Examples of the monomer represented by the formula (4) are 1,1-bis(3-methyl-4-hydroxyphenyl)ethane, 9,9-bis(3-phenyl-4-hydroxyphenyl) fluorene, bis(4-hydroxyphenyl) methane, 1,1-bis(4-hydroxyphenyl)ethane, 1,2-bis(4-hydroxyphenyl) ethane, 2,2-bis(4-hydroxyphenyl) propane, 2,2-bis(3-methyl-4-hydroxyphenyl) butane, 2,2-bis(4-hydroxyphenyl) butane, 2,2-bis(4-hydroxyphenyl) octane, 4,4-bis(4-hydroxyphenyl) heptane, 1,1-bis(4-hydroxyphenyl)-1, 1-diphenyl methane, 1,1-bis(4-hydroxyphenyl)-1-phenyl ethane, 1,1-bis(4-hydroxyphenyl)1-phenyl methane, bis(4-hydroxyphenyl) ether, bis(4-hydroxyphenyl) sulfide, bis(4-hydroxyphenyl) sulfone, 1,1-bis(4-hydroxyphenyl) cyclopentane, 1,1-bis(3-methyl-4-hydroxyphenyl) cyclopentane, 1,1-bis(4-hydroxyphenyl) cyclohexane, 2,2-bis(3-methyl-4-hydroxyphenyl) propane, 2,2-bis(3-phenyl-4-hydroxyphenyl) propane, 2,2-bis(4-hydroxyphenyl) adamantane, 2,2-bis(3-methyl-4-hydroxyphenyl) adamantane, 1,3-bis(4-hydroxyphenyl) adamantane, 1,3-bis(3-methyl-4-hydroxyphenyl) adamantane, 2-(3-methyl-4-hydroxyphenyl)-2-(4-hydroxyphenyl)-1-phenyl ethane, bis (3-methyl-4-hydroxyphenyl) sulfide, bis(3-methyl-4-hydroxyphenyl) sulfone, bis(3-methyl-4-hydroxyphenyl) methane, 1,1-bis(3-methyl-4-hydroxyphenyl) cyclohexane, 2,7-naphthalenediol, 2,6-naphthalenediol, 1,4-naphthalenediol, 1,5-naphthalenediol, 2,2-bis(2-methyl-4-hydroxyphenyl) propane, 1,1-bis(2-butyl-4-hydroxy-5-methylphenyl) butane, 1,1-bis(2-tert-butyl-4-hydroxy-3-methylphenyl) ethane, 1,1-bis(2-tert-butyl-4-hydroxy-5-methylphenyl) propane, 1,1-bis(2-tert-butyl-4-hydroxy-5-methylphenyl) butane, 1,1-bis(2-tert-butyl-4-hydroxy-5-methylphenyl) isobutane, 1,1-bis(2-tert-butyl-4-hydroxy-5-methylphenyl) heptane, 1,1-bis(2-tert-butyl-4-hydroxy-5-methylphenyl)-1-phenyl methane, 1,1-bis(2-tert-amyl-4-hydroxy-5-methylphenyl) butane, bis(3-chloro-4-hydroxyphenyl) methane, bis(3,5-dibromo-4-hydroxyphenyl) methane, 2,2-bis(3-chloro-4-hydroxyphenyl) propane, 2,2-bis(3-fluoro-4-hydroxyphenyl) propane, 2,2-bis(3-bromo-4-hydroxyphenyl) propane, 2,2-bis(3,5-difluoro-4-hydroxyphenyl) propane, 2,2-bis(3,5-dichloro-4-hydroxyphenyl) propane, 2,2-bis(3,5-dibromo-4-hydroxyphenyl) propane, 2,2-bis(3-bromo-4-hydroxy-5-chlorophenyl) propane, 2,2-bis(3,5-dichloro-4-hydroxyphenyl) butane, 2,2-bis(3,5-dibromo-4-hydroxyphenyl) butane, 1-phenyl-1,1-bis(3-fluoro-4-hydroxyphenyl) ethane, bis(3-fluoro-4-hydroxyphenyl) ether, 3,3'-difluoro-4,4'-dihydroxy biphenyl, 1,1-bis(3-cyclohexyl-4-hydroxyphenyl) cyclohexane, 2,2-bis(4-hydroxyphenyl) hexafluoro propane, 1,1-bis(3-phenyl-4-hydroxyphenyl) cyclohexane, bis(3-phenyl-4-hydroxyphenyl) sulfone, 4,4'-(3,3,5-trimethylcyclohexylidene) diphenol, 4,4'-[1,4-phenylene bis(1-methylethylidene)] bisphenol, 4,4'-[1,3-phenylene bis(1-methylethylidene)] bisphenol, 9,9-bis(4-hydroxyphenyl) fluorene, 9,9-bis(4-hydroxy-3-methylphenyl) fluorene, terminal phenol polydimethylsiloxane, α,ω-bis(3-(4-hydroxy-3-methoxyphenyl) propyl)-dimethylsiloxy-polydimethylsiloxane, and α-trimethylsiloxy-ω-bis{3-(2-hydroxyphenyl) propyldimethylsiloxy}-methylsiloxy-2-dimethylsilylethyl-polydimethylsiloxane. One of the above bisphenol compounds may be singularly used, or two or more of them may be mixed for use. In addition, by using trivalent or multivalent phenol, a branched structure may be included therein.

Among the above bisphenol compounds, 1,1-bis(4-hydroxyphenyl) ethane, 2,2-bis(4-hydroxyphenyl) butane, 2,2-bis(4-hydroxyphenyl) propane, 1,1-bis(4-hydroxyphenyl)-1, 1-diphenyl methane, 1,1-bis(4-hydroxyphenyl)1-phenyl ethane, bis(4-hydroxyphenyl) sulfone, 1,1-bis(4-hydroxyphenyl) cyclohexane, 2,2-bis(3-methyl-4-hydroxyphenyl) propane, 1,1-bis(3-methyl-4-hydroxyphenyl) cyclohexane, 1,1-bis(3-methyl-4-hydroxyphenyl) cyclopentane, 2,2-bis(3-phenyl-4-hydroxyphenyl) propane, 4,4'-(3,3,5-trimethylcyclohexylidene) diphenol, 4,4'-[1,4-phenylene bis(1-methylethylidene)] bisphenol, 4,4'-[1,3-phenylene bis(1-methylethylidene)] bisphenol, 9,9-bis(4-hydroxyphenyl) fluorene, 9,9-bis(4-hydroxy-3-methylphenyl) fluorene, terminal phenol polydimethylsiloxane, α-trimethylsiloxy-ω-bis{3-(2-hydroxyphenyl) propyldimethyl siloxy}-methylsiloxy-2-dimethylsilylethyl-polydimethylsiloxane, and α,ω-bis(3-(4-hydroxy-3-methoxyphenyl) propyl)-dimethylsiloxy-polydimethylsiloxane are preferable.

Further preferable examples are 1,1-bis(4-hydroxyphenyl) ethane, 2,2-bis(4-hydroxyphenyl) butane, 2,2-bis(4-hydroxyphenyl) propane, 1,1-bis(4-hydroxyphenyl)1-phenyl ethane, 1,1-bis(4-hydroxyphenyl) cyclohexane, 2,2-bis(3-methyl-4-hydroxyphenyl) propane, 1,1-bis(3-methyl-4-hydroxyphenyl) cyclohexane, 1,1-bis(3-methyl-4-hydroxyphenyl) cyclopentane, 2,2-bis(3-phenyl-4-hydroxyphenyl) propane, 4,4'-(3,3,5-trimethylcyclohexylidene) diphenol, and 9,9-bis(4-hydroxy-3-methylphenyl) fluorene.

When the copolymerized PC manufactured with use of such bisphenol compound(s) as the monomer is applied to an electrophotographic photoreceptor, the electrophotographic photoreceptor becomes invulnerable to friction with other components in a cleaning process and the like, so that the durability thereof is favorably enhanced.

The copolymerized PC according to this exemplary embodiment can be easily obtained by conducting polycondensation such as interfacial polycondensation with use of the monomer represented by the formula (3) and the monomer represented by the formula (4).

For instance, by conducting interfacial polycondensation under the presence of an acid-binding agent with use of various carbonyl dihalide such as phosgene, halo formates such as chloroformate compounds or a carbonate ester compound, carbonate ester bonding can be favorably formed. Alternatively, interesterification may be conducted. The above reaction(s) is conducted under the presence of a terminal terminator and/or a branching agent as needed.

As the terminal terminator, monovalent carboxylic acid and derivatives thereof, and monovalent phenol are usable. For instance, p-tert-butyl-phenol, p-phenylphenol, p-cumylphenol, p-perfluoro nonylphenol, p-(perfluoro nonyl phenyl) phenol, p-(perfluoroxyl phenyl) phenol, p-tert-perfluorobutyl phenol, 1-(P-hydroxybenzyl) perfluorodecane, p[2-(1H,1H-perfluorotridodecyloxy)-1,1,1,3,3,3-hexafluoro propyl] phenol, 3,5-bis(perfluoro hexyloxy carbonyl) phenol, p-hydroxy perfluoro dodecyl benzoate, p-(1H,1H-perfluoro octyloxy) phenol, 2H,2H,9H-perfluoro nonane acid, 1,1,1,3, 3,3-tetraphloro-2-propanol, or alcohols represented by the following formulae are preferably used.

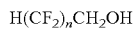

(n represents an integer of 1 to 12.)

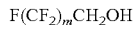

(m represents an integer of 1 to 12.)

A ratio at which the terminal terminator is added is 0.05 to 30 mol % per the copolymer composition, more preferably 0.1 to 10 mol %. When the ratio is more than 30 mol %, mechanical strength may be deteriorated. When the content is less than 0.05 mol %, moldability may be deteriorated.

Examples of the branching agent are phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl) heptane, 1,3,5-tris(2-hydroxyphenyl) benzene, 1,3,5-tris(4-hydroxyphenyl) benzene, 1,1,1-tris(4-hydroxyphenyl) ethane, tris(4-hydroxyphenyl) phenylmethane, 2,2-bis[4,4-bis(4-hydroxyphenyl) cyclohexyl] propane, 2,4-bis[2-bis(4-hydroxyphenyl)-2-propyl] phenol, 2,6-bis(2-hydroxy-5-methylbenzyl)-4-methylphenol, 2-(4-hydroxyphenyl)-2-(2, 4-dihydroxyphenyl) propane, tetrakis(4-hydroxyphenyl) methane, tetrakis[4-(4-hydroxyphenyl isopropyl) phenoxy] methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl) oxyindole, 5-chloroisatin, 5,7-dichloroisatin and 5-bromoisatin.

An additive amount of the branching agent is preferably 30 mol % or less per the copolymer composition, more preferably 5 mol % or less. When the additive amount is more than 30 mol %, moldability may be deteriorated.

Examples of the acid-binding agent usable in interfacial polycondensation are alkaline earth metal hydroxide such as sodium hydroxide, potassium hydroxide, magnesium hydroxide and calcium hydroxide, alkali metal hydroxide such as lithium hydroxide and cesium hydroxide, alkali metal carbonate such as sodium carbonate and kalium carbonate, organic base such as pyridine or mixture(s) of the above. Use ratio of the acid-binding agent may be also suitably adjusted in consideration of stoichiometric proportion (equivalent amount) in the reaction. Specifically, per 1 mol of a hydroxyl group of the divalent phenol (material), 1 equivalent or more, preferably 1 to 10 equivalent of the acid-binding agent may be used.

Preferable examples of a solvent usable therein are aromatic hydrocarbon such as toluene and xylene, halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2,-tetrachloroethane, pentachloroethane and chlorobenzene, and acetophenone. One of the above solvents may be singularly used, or two or more of the above may be used together. With use of two solvents that are not miscible with each other, interfacial polycondensation may be conducted.

Preferable examples of the catalyst are tertiary amine such as trimethyl amine, triethyl amine, tributyl amine, N,N-dimethylcyclohexyl amine, pyridine and dimethyl aniline, quaternary ammonium salt such as trimethyl benzyl ammonium chloride, triethyl benzyl ammonium chloride, tributyl benzyl ammonium chloride, trioctyl methyl ammonium chloride, tetrabutyl ammonium chloride and tetrabutyl ammonium bromide, and quaternary phosphonium salt such as tetrabutyl phosphonium chloride and tetrabutyl phosphonium bromide.

Further, if necessary, a small amount of an antioxidant such as sodium sulfite and hydrosulfite salt may be added to the reaction system.

For manufacturing of the copolymerized PC, various methods are specifically usable. According to a usable exemplary method, polycarbonate oligomer is manufactured by reacting a divalent phenol (biphenols represented by the formula (3) and/or the bisphenols represented by the formula (4)) with phosgene, and then the polycarbonate oligomer is reacted with the above divalent phenol under the presence of a mixture of the above catalyst and an alkali aqueous solution of the above acid-binding agent. Alternatively, the above divalent phenol and phosgene may be reacted with each other in the mixture of the catalyst and the alkali aqueous solution. Typically, the former method (i.e., the method in which polycarbonate oligomer is manufactured in advance) is preferable in terms of efficiency.

In order to manufacture polycarbonate oligomer, the divalent phenol is initially dissolved in an alkali aqueous solution to prepare an alkali aqueous solution of the divalent phenol. Subsequently, phosgene is introduced into a mixture of the prepared alkali aqueous solution and an organic solvent such as methylene chloride for a reaction therein, and polycarbonate oligomer of the divalent phenol is synthesized. Then, the reaction solution is subjected to a separation into aqueous phase and organic phase, so that organic phase containing polycarbonate oligomer is obtained. At this time, alkali concentration of the alkali aqueous solution is preferably in a defined range of 0.1 to 5N. A volume ratio of the organic phase to the aqueous phase is in a range of 10:1 to 1:10, preferably in a range of 5:1 to 1:5.

A reaction temperature is typically in a range of 0 to 70 degrees C. under cooling, more preferably in a range of 5 to 65 degrees C. Reaction time is in a range of 15 minutes to 4 hours, preferably 30 minutes to 3 hours. The average molecular weight of the obtained polycarbonate oligomer is 6000 or less. The polymerization degree of the polycarbonate oligomer is typically 20 or less. The polycarbonate oligomer is preferably any one of dimer to decamer.

The organic phase containing the obtained polycarbonate oligomer is added with the above divalent phenol for reaction. The reaction temperature is 0 to 150 degrees C., preferably 5 to 40 degrees C., more preferably 5 to 30 degrees C., particularly preferably 5 to 20 degrees C. Particularly by conducting the reaction at the reaction temperature of 30 degrees C. or less (more particularly 20 degrees C. or less), coloration of the generated copolymerized PC can be restrained (i.e., increase in YI can be restrained).

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to 2 hours.

At the time of the reaction, the divalent phenol is preferably added in a form of an organic-solvent solution and/or an alkali aqueous solution. The order of the addition is not specifically limited. In the above manufacturing method, the catalyst, the terminal terminator, the branching agent and the like may be added as needed at the time of manufacturing polycarbonate oligomer or at the time of subsequent polymerization reaction, or both at the time of manufacturing polycarbonate oligomer and at the time of subsequent polymerization reaction.

For controlling the concentration of biphenols residual in the generated copolymerized PC (unreacted monomer) to be 90 mass ppm or less, various methods are available. Examples of the methods are: (1) a method of reducing the residual amount of the monomer by optimizing the reaction equivalent amount at the time of polymerization; (2) a method of eliminating the residual unreacted monomer by optimizing cleaning conditions of the alkali aqueous solution in a cleaning process subsequent to the polymerization; (3) a method of preferentially dissolving the unreacted monomer in a crystallization process and treating the copolymerized PC with a crystallizable solvent; and (4) a method of checking an amount of the residual unreacted monomer during the manufacturing process (at a point prior to the alkali cleaning process and the crystallization process) and eliminating the monomer depending on the amount of the unreacted monomer (in the alkali cleaning process and the crystallization process).

With respect to the cleaning process subsequent to the polymerization in the method (2) above, the following can be noted.

In this exemplary embodiment, since the unreacted monomer and low-molecular-weight impurities are incorporated into the polymer solid after the copolymerized PC is formed into flake, cleaning with water or other liquid can only eliminate the unreacted monomer and the impurities adhering to the surface of the flake. On the other hand, in the cleaning of the polymer solution, the impurities can be reduced by back extraction of the residual monomer and the like (i.e., alkaline soluble components).

In the cleaning of the polymer solution, water cleaning is initially conducted so as to dilute the high-concentration solution at the time of polymerization. With this arrangement, separation into the aqueous solution and the polymer solution is facilitated. Subsequently, by cleaning with an aqueous solution of sodium hydroxide, the residual biphenols are inversely extracted by alkali into the tank and eliminated. According to the aspect of the invention, cleaning is continuously conducted until the impurities in the final polymer satisfies the conditions required by this invention. For instance, in the later-described examples of the invention, cleaning was conducted one to three times.

A preferable concentration range of the aqueous solution of sodium hydroxide is 0.01 to 1N. Within this range, the residual biphenols are effectively eliminated. When the concentration is less than 0.01N, efficiency at which the residual biphenols is extracted may be reduced, thereby increasing the residual amount. On the other hand, when the concentration is more than 1N, the polymer may be degraded.

If alkali components are residual after the cleaning with the aqueous solution of sodium hydroxide, the product polymer may undergo hydrolysis. Thus, cleaning with an aqueous solution of HCl is conducted.

A preferable concentration range of the aqueous solution of HCl is such a range as to be capable of neutralizing alkali (for instance, 0.001 to 0.1N). In the cleaning with the aqueous solution of HCl, the residual alkali components are cleaned to such a extent that the alkali components no longer affects the degradation of the polymer. For instance, in the later-described examples of the invention, cleaning was conducted one to three times.

After the cleaning with the aqueous solution of HCl, cleaning with water is finally conducted so as to eliminate ionic impurities.

The obtained copolymerized PC contains the repeating unit(s) represented by the formula (1) and the repeating unit(s) represented by the formula (2), in which the content of biphenols having the structure represented by the formula (3) is 90 mass ppm or less.

As long as an object of the invention is not hampered, the copolymerized PC may contain a polycarbonate unit having a structure unit other than those of the formulae (1) and (2), or a unit having a polyester structure, a polyurethane structure, a polyether structure or a polysiloxane structure.

In addition, among the divalent phenol used as the monomer, biphenols typically contain a minute amount of impurities. By controlling, among such impurities, the content of trihydroxy biphenyls (a biphenyl compound having three phenolic hydroxyl groups in one molecule) to be 300 mass ppm or less, YI of the copolymerized PC can be easily controlled to be 3 or less. As a consequence, pellets and moldings molded of the copolymerized PC (flake powder) exhibit substantially no coloration. When the content of trihydroxy biphenyls is more than 300 mass ppm, impurities can be reduced by optimizing the cleaning conditions of the polymer.

In addition, since the content of trihydroxy biphenyls, which is detrimental for electrostatic characteristics, is small, the copolymerized PC is also a favorable material of a molding usable for electrophotographic photoreceptors. The content of trihydroxy biphenyls in the biphenols is preferably 150 mass ppm or less, more preferably 20 mass ppm or less, the most preferably 10 mass ppm or less.

In addition, in order to control YI of the copolymerized PC to be 3 or less, it is also effective to control the content of 3-tert-butyl-4,4'-dihydroxy biphenyl in biphenols to be 370 mass ppm or less, preferably 300 mass ppm or less, more preferably 30 mass ppm or less.

For reducing the content of such impurities, a method of highly-accurately eliminating divalent phenol such as catechol from the material at the time of synthesizing biphenols, a method of recrystallizing the obtained biphenols with alcohols (such as methanol, ethanol and isopropanol) and ketones (such as acetone and methyl ethyl ketone) or a method of separating by use of column is available. Particularly, the method of recrystallizing the obtained biphenols is preferable in that products of high purity can be obtained on industrial scale.

For controlling the reduced viscosity [$\eta_{sp}/C$] (a value correlated to the viscosity-average molecular weight) of the obtained copolymerized PC to be within the above-described range, various methods (such as a method of selecting the reaction conditions and a method of adjusting the use amount of the branching agent and a molecular weight adjuster) are available. In addition, if necessary, the obtained copolymerized PC may be subjected to a physical treatment such as mixing and cutoff and/or a chemical treatment such as polymer reaction, cross linking or partial degradation), so that the copolymerized PC having a predetermined reduced viscosity $[\eta_{sp}/C]$ may be obtained.

The obtained reaction product (crude product) may be subjected to various aftertreatments such as known separation and refinement, so that the copolymerized PC having desirable purity (desirable refining degree) may be obtained.

[Arrangement of Electrophotographic Photoreceptor]

An electrophotographic photoreceptor containing a molding in which the above-described copolymerized PC is used as the binder resin can be formed.

As long as the above-described copolymerized PC is used as the binder resin in the photosensitive layer, the electrophotographic photoreceptor according to this exemplary embodiment may be any electrophotographic photoreceptor (e.g. one of known various electrophotographic photoreceptors). However, the electrophotographic photoreceptor preferably includes at least one charge generating layer and at least one charge transporting layer, or alternatively includes a single layer that contains both a charge generating material and a charge transporting material.

While the copolymerized PC may be used in any portion of the photosensitive layer, in order for the invention to sufficiently provide an advantage, the copolymerized PC is preferably used as the binder resin of the charge transporting material, as the binder resin of the single photosensitive layer or as a surface protecting layer. When the electrophotographic photoreceptor has double charge transporting layers (i.e., multilayer electrophotographic photoreceptor), the copolymerized PC is preferably used in either one of the charge transporting layers.

In the electrophotographic photoreceptor according to this exemplary embodiment, one type of the copolymerized PC according to this exemplary embodiment may be singularly used, or two or more types thereof may be used together. Further, as long as an object of the invention is not hampered, a binder-resin component such as another polycarbonate may be contained as desired. In addition, an additive such as antioxidant may be contained.

The electrophotographic photoreceptor according to this exemplary embodiment has its photosensitive layer on a conductive substrate. When the photosensitive layer has the charge generating layer and the charge transporting layer, the charge transporting layer may be laminated on the charge generating layer, or the charge generating layer may be laminated on the charge transporting layer. Further alternatively, the single layer of the electrophotographic photoreceptor may contain both the charge generating material and the charge transporting material. When necessary, a surface layer of the electrophotographic photoreceptor may be provided with a conductive or insulating protective film. The electrophotographic photoreceptor may be further provided with an intermediate layer(s) such as adhesive layer for enhancing adhesion between layers and blocking layer for blocking charges.

Various conductive substrate materials (e.g., known materials) are usable for forming the electrophotographic photoreceptor according to this exemplary embodiment. Examples of such conductive substrate materials are: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide; tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer contains at least the charge generating material. The charge generating layer can be obtained by forming a layer of the charge generating material on the underlying substrate by vacuum deposition, sputtering or the like, or by forming a layer in which the charge generating material is bound onto the underlying substrate with use of a binder resin. While various methods (e.g., known methods) are usable for forming the charge generating layer with use of a binder resin, the charge generating layer is preferably obtained as a wet molding typically formed by applying, for instance, a coating agent in which both the charge generating material and the binder resin are dispersed or dissolved in a suitable solvent onto a predetermined underlying substrate and drying the applied coating agent.

Various known materials are usable as the charge generating material in the charge generating layer. Examples of such materials are: elementary selenium such as amorphous selenium and trigonal selenium; selenium alloy such as selenium-tellurium; selenium compound or selenium-containing composition such as $As_2Se_3$; inorganic material formed of 12 group element and 16 group element in the periodic system such as zinc oxide and CdS—Se; oxide-base semiconductor such as titanium oxide; silicon-base material such as amorphous silicon; metal-free phthalocyanine pigment such as τ-type metal-free phthalocyanine and χ-type metal-free phthalocyanine; metal phthalocyanine pigment such as α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine whose black angle 2θ has its diffraction peak at 27.3±0.2 degrees in a X-ray diffraction diagram, and gallium phthalocyanine; cyanine dye; anthracene pigment; bisazo pigment; pyrene pigment; polycyclic quinone pigment; quinacridone pigment; indigo pigment; perylene pigment; pyrylium pigment; squarium pigment; anthoanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrylium dye; polyvinyl carbazole; and bisbenzimidazole pigment. One of the above compounds may be singularly used, or two or more of them may be mixed for use as the charge generating material. Among the above charge generating materials, a compound disclosed in JP-A-11-172003 is preferable.

The charge transporting layer can be obtained by forming a layer in which the charge transporting material is bound onto the underlying substrate by a binding resin.

The binder resin for the charge generating layer and the charge transporting layer is not specifically limited. Various known resins are usable. Examples of such resins are polystyrene, polyvinyl chloride, polyvinyl acetate, vinyl chloride-vinyl acetate copolymer, polyvinyl acetal, alkyd resin, acrylic resin, polyacrylonitrile, polycarbonate, polyamide, butyral resin, polyester, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride-base polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate, and polyester acrylate.

One of the above resins may be singularly used, or two or more of them may be mixed for use. The binder resin used in the charge generating layer and the charge transporting layer is preferably the above-described copolymerized PC.

While various known methods are usable for forming the charge transporting layer, the charge transporting layer is preferably obtained as a wet molding typically formed by applying a coating agent in which both the charge transporting material and the copolymerized PC according to this exemplary embodiment are dispersed or dissolved in a suitable solvent onto a predetermined underlying substrate and drying the applied coating agent. For forming the charge transporting layer, the charge transporting material and the copolymerized PC are mixed together preferably by a mass ratio of 20:80 to 80:20, more preferably 30:70 to 70:30.

In the charge transporting layer, one type of the copolymerized PC according to this exemplary embodiment may be singularly used, or two or more types thereof may be used together. As long as an object of the invention is not hampered, the charge transporting layer may also contain another binder resin in addition to the copolymerized PC according to this exemplary embodiment.

The thickness of the charge transporting layer is typically approximately 5 to 100 μm, preferably 10 to 30 μm. When the thickness is less than 5 μm, the initial potential may be lowered. When the thickness is more than 10 μm, electrophotographic characteristics may be deteriorated.

Various known compounds are usable as the charge transporting material that is usable together with the copolymerized PC according to this exemplary embodiment. Preferable examples of such compounds are carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be singularly used, or two or more of the above may be used together.

Among the above charge transporting materials, a compound disclosed in JP-A-11-172003 is particularly preferably usable.

In the electrophotographic photoreceptor according to this exemplary embodiment, the copolymerized PC according to this exemplary embodiment is used as the binder resin in at least either one of the charge generating layer and the charge transporting layer.

The electrophotographic photoreceptor according to this exemplary embodiment may be provided with a typically-used undercoat layer between the conductive substrate and the photosensitive layer. Examples of the undercoat layer are particles such as titanium oxide, aluminum oxide, zirconia, titanic acid, zirconic acid, lanthanum lead, titanium black, silica, lead titanate, barium titanate, tin oxide, indium oxide and silicon oxide, and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the copolymerized PC according to this exemplary embodiment. One of the above particles and the resins may be singularly used or a variety thereof may be mixed together in use. When a mixture thereof is used, a combination of inorganic particles and a resin is preferable because a flat and smooth film can be made.

The thickness of the undercoat layer is typically approximately 0.01 to 10 μm, preferably 0.1 to 7 μm. When the thickness is less than 0.01 μm, it is difficult to form an even undercoat layer. On the other hand, when the thickness is more than 10 μm, electrophotographic characteristics may be deteriorated. The electrophotographic photoreceptor according to this exemplary embodiment may be provided with a typically-used known blocking layer between the conductive substrate and the photosensitive layer. The blocking layer may be made of the same resin as the binder resin. Alternatively, the blocking layer may be made of the polycarbonate resin according to this exemplary embodiment. The thickness of the blocking layer is typically 0.01 to 20 μm, preferably 0.1 to 10 μm. When the thickness is less than 0.01 μm, it is difficult to form an even blocking layer. On the other hand, when the thickness is more than 20 μm, electrophotographic characteristics may be deteriorated.

The electrophotographic photoreceptor according to this exemplary embodiment may be further provided with a protective layer laminated on the photosensitive layer. The protective layer may be made of the same resin as the binder resin. Alternatively, the protective layer may be made of the polycarbonate resin according to this exemplary embodiment. The thickness of the protective layer is typically 0.01 to 20 μm, preferably 0.1 to 10 μm. The protective layer may contain a conductive material such as the charge generating material, the charge transporting material, an additive, a metal, oxides thereof, nitrides thereof, salts thereof, alloy thereof, carbon black and an organic conductive compound.

In order to enhance performance of the electrophotographic photoreceptor, the charge generating layer and the charge transporting layer may be added with a binder, a plasticizer, a curing catalyst, a fluidity adder, a pinhole controller and a spectral-sensitivity sensitizer (sensitizer dye). In addition, in order to prevent increase in residual potential after repeated use, reduction in charged potential and deterioration of sensitivity, various chemical substances and additives such as antioxidant, surfactant, curl inhibitor and leveling agent may be added.

Examples of the binders are silicone resin, polyamide resin, polyurethane resin, polyester resin, epoxy resin, polyketone resin, polycarbonate resin, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy resin, polyvinyl butyral resin, formal resin, vinyl acetate resin, vinyl acetate/vinyl chloride copolymer resin, and polyester carbonate resin. In addition, a heat and/or light-curable resin is also usable. The binder is not specifically limited to the above, as long as the binder is an electric-insulating resin from which a film is formable under normal conditions, and as long as an advantage of the invention is not hampered.

Examples of the plasticizer are biphenyl, chlorinated biphenyl, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst are methanesulfonic acid, dodecylbenzenesulfonic acid and dinonylnaphthalene disulfonic acid. Examples of the fluidity adder are Modaflow™ and Acronal 4F™. Examples of the pinhole controller are benzoin and dimethyl phthalate. The above plasticizer, curing catalyst, fluidity adder and pinhole controller are preferably contained at a content of 5 mass % or less of the charge transporting material.

When a sensitizer dye is used as a spectral-sensitivity sensitizer, suitable examples of the sensitizer dye are triphenylmethane-base dye such as methyl violet, crystal violet, night blue and Victria blue, acridine dye such as erythrosine, Rhodamine B, Rhodamine 3R, acridine orange and frapeosine, thiazine dye such as methylene blue and methylene green, oxazine dye such as capri blue and meldra blue, cyanine dye, merocyanine dye, styryl dye, pyrylium salt dye and thiopyrylium salt dye.

In order to enhance the sensitivity, reduce the residual potential and reduce fatigue due to repeated use, the photosensitive layer may be added with an electron-accepting material. Examples of the electron-accepting material are preferably compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4,4'-dinitrobenzophenone, 4-nitrobenzal malonodinitrile, α-cyano-β-(p-cyanophenyl) ethyl acrylate, 9-anthracenyl methylmalonodinitrile, 1-cyano-(p-nitrophenyl)-2-(p-chlorophenyl) ethylene, 2,7-dinitro fluorenone, 2,4,7-trinitro fluorenone, 2,4,5,7-tetranitro fluorenone, 9-fluorenylidene-(dicyano methylene malononitrile), polynitro-9-fluorenylidene-(dicyano methylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. An additive ratio of the compounds is 0.01 to 200 parts by mass per 100 parts by mass of the charge generating material or the charge transporting material, preferably 0.1 to 50 parts by mass.

Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, or fluorine-base graft polymer may be used. An additive ratio of such surface modifiers is 0.1 to 60 mass % of the binder resin, preferably 5 to 40 mass %. When the additive ratio is less than 0.1 mass %, surface modification such as enhancement of surface durability and reduction in surface energy may not be sufficient. When the additive ratio is more than 60 mass %, the electrophotographic characteristics may be deteriorated.

Examples of the antioxidant to be added to the charge generating layer and the charge transporting layer are antioxidants having a radical-supplementing capability, a radical-chain inhibiting capability and/or a peroxide decomposing capability such as hindered phenol-base antioxidant, aromatic amine-base antioxidant, hindered amine-base antioxidant, sulfide-base antioxidant and organophosphate-base antioxidant. An additive ratio of such antioxidants is typically 0.01 to 10 mass % of the charge transporting material, preferably 0.1 to 2 mass %.

Preferable examples of such antioxidants are compounds represented by chemical formulae disclosed in the Specification of JP-A-11-172003 ([Chemical Formula 94] to [Chemical Formula 101]).

One of the above antioxidants may be singularly used, or two or more of them may be mixed in use. In addition to the photosensitive layer, the above antioxidant may be added to the surface protecting layer, the undercoat layer and the blocking layer.

By adding such an antioxidant, radical can be supplemented, and degradation of the charge generating layer and the charge transporting layer can be prevented.

Examples of the solvent usable in forming the charge generating layer and the charge transporting layer are aromatic solvent such as benzene, toluene, xylene and chlorobenzene, ketone such as acetone, methyl ethyl ketone and cyclohexanone, alcohol such as methanol, ethanol and isopropanol, ester such as acetic ether and ethyl cellosolve, halogenated hydrocarbon such as carbon tetrachloride, carbon tetrabromide, chloroform, dichloromethane and tetrachloroethane, ether such as tetrahydrofuran and dioxane, dimethylformamide, dimethylsulfoxide, and diethyl formamide. One of the above solvents may be singularly used, or two or more of them may be used together as a mixture solvent.

The photosensitive layer of a single-layer electrophotographic photoreceptor can be easily formed by applying the binder resin (copolymerized PC) according to this exemplary embodiment with use of the charge generating material, the charge transporting material and the additive. The charge transporting material is preferably added with the above-described hole-transport material and/or an electron-transport material. Compounds disclosed in JP-A-2005-139339 can be preferably applied as the electron-transport material.

Various coating applicators (e.g., known applicators) can perform application of each layer. Examples of such a coating applicator are an applicator, a spray coater, a bar coater, a chip coater, a roll coater, a dip coater and a doctor blade.

The thickness of the photosensitive layer of the electrophotographic photoreceptor is 5 to 100 μm, preferably 8 to 50 μm. When the thickness is 5 μm or less, the initial potential tends to be low. When the thickness is more than 100 μm, electrophotographic characteristics may be deteriorated. In the electrophotographic photoreceptor, a ratio of the charge generating material to the binder resin is 1:99 to 30:70 by mass, more preferably 3:97 to 15:85 by mass. On the other hand, a ratio of the charge transporting material to the binder resin is 10:90 to 80:20 by mass, more preferably 30:70 to 70:30 by mass.

Since the electrophotographic photoreceptor according to this exemplary embodiment uses the copolymerized PC according to this exemplary embodiment, a coating agent is not whitened (gelled) in manufacturing the photosensitive layer. In addition, since containing a molding (binder resin) molded of the copolymerized PC according to this exemplary embodiment in its photosensitive layer, the electrophotographic photoreceptor according to this exemplary embodiment has excellent durability and such excellent electrostatic characteristics that a range within which residual potential of the electrophotographic photoreceptor is increased after repeated use is small. Thus, the photoreceptor according to this exemplary embodiment can maintain its excellent electrophotographic characteristics for a long time. Accordingly, the photoreceptor according to this exemplary embodiment is favorably applicable to various electrophotographic fields such as copier (black and white copier, multi-color copier, full-color copier; analog copier, digital copier), printer (laser printer, LED printer, liquid-crystal shutter printer), facsimile, platemaker and equipment capable of functioning as a plurality of them.

The electrophotographic photoreceptor according to this exemplary embodiment is electrified in use by corona discharge (corotron, scorotron), contact charging (charge roll, charge brush) or the like. For exposure, a halogen lamp, a fluorescent lamp, laser (semiconductor, He—Ne), LED or a photoreceptor internal exposure system may be used. For image development, dry developing such as cascade developing, two-component magnetic brush developing, one-component insulating toner developing and one-component conductive toner developing, and wet developing may be used. For transfer, electrostatic transfer such as corona transfer, roller transfer and belt transfer, pressure transfer and adhesive transfer may be used. For fixing, heat roller fixing, radiant flash fixing, open fixing, pressure fixing and the like may be used. For cleaning and neutralizing, brush cleaner, magnetic brush cleaner, electrostatic brush cleaner, magnetic roller cleaner, blade cleaner and those in which cleaner is omitted may be used. Examples of a resin for toner are styrene-base resin, styrene-acrylic base copolymer resin, polyester, epoxy resin and cyclic hydrocarbon polymer. The toner may be spherical or amorphous. The toner may also be controlled to have a certain shape (such as spheroidal shape and potato shape). The toner may be pulverized toner, suspension-polymerized toner, emulsion-polymerized toner, chemically-pelletized toner, or ester-elongation toner.

Second Embodiment

A second exemplary embodiment of the invention will be described in detail below.

In describing this exemplary embodiment, what has been described in the above first exemplary embodiment will not be duplicated.

[Structure of Copolymerized PC]

A copolymerized PC according to this exemplary embodiment is a polycarbonate copolymer that contains: 0.1 to 50 mol % of the monomer unit represented by the formula (1); and the monomer unit represented by the formula (2), in which the content of a biphenyl compound having three phenolic hydroxyl groups in one molecule is 200 mass ppb or less.

According to this exemplary embodiment, since the content of trihydroxy biphenyls in the copolymerized PC is 200 mass ppb or less, the copolymerized PC exhibits less coloration when melt molded. With this arrangement, hue of the molding can be so considerably improved as to be favorably applicable to optical materials. When the copolymerized PC is molded into a molding usable for electrophotographic photoreceptors while the content of trihydroxy biphenyls is 200 mass ppb or less, increase in residual potential of the electrophotographic photoreceptors after repeated use can be favorably restrained.

The content of trihydroxy biphenyls is preferably 150 mass ppb or less, more preferably 100 mass ppb or less and the most preferably 50 mass ppb or less.

[Manufacturing Method of Copolymerized PC]

As in the first exemplary embodiment, the copolymerized PC according to this exemplary embodiment can be easily obtained by conducting polycondensation such as interfacial polycondensation with use of the monomer represented by the formula (3) and the monomer represented by the formula (4).

Examples of the methods for controlling the concentration of residual trihydroxy biphenyls (triphenol) in the generated copolymerized PC to be 200 mass ppb or less are: (1) a method of reducing the residual amount of the monomer by optimizing the reaction equivalent amount at the time of polymerization; (2) a method of eliminating the residual unreacted monomer by optimizing cleaning conditions of the alkali aqueous solution in a cleaning process subsequent to the polymerization; (3) a method of preferentially dissolving the unreacted monomer in a crystallization process and treating the copolymerized PC with a crystallizable solvent; and (4) a method of checking an amount of the residual unreacted monomer during the manufacturing process (at a point prior to the alkali cleaning process and the crystallization process) and eliminating the monomer depending on the amount of the unreacted monomer (in the alkali cleaning process and the crystallization process).

In this exemplary embodiment, since the unreacted monomer and low-molecular-weight impurities are incorporated into the polymer solid after the copolymerized PC is formed into flake, cleaning with water or other liquid can only eliminate the unreacted monomer and the impurities adhering to the surface of the flake. On the other hand, in the cleaning of the polymer solution, the impurities can be reduced by back extraction of the residual monomer and the like (i.e., alkaline soluble components).

The same as the first exemplary embodiment applied to the cleaning process subsequent to the polymerization (method (2)), so that description thereof will be omitted.

The obtained copolymerized PC contains the repeating unit(s) represented by the formula (1) and the repeating unit(s) represented by the formula (2), in which the content (residual amount) of trihydroxy biphenyls is 200 mass ppb or less.

As long as an object of the invention is not hampered, the copolymerized PC may contain a polycarbonate unit having a structure unit other than those of the formulae (1) and (2), or a unit having a polyester structure, a polyurethane structure, a polyether structure or a polysiloxane structure.

In addition, among the divalent phenols used as the monomer, biphenols typically contain a minute amount of impurities. By controlling, among such impurities, the content of trihydroxy biphenyls to be 300 mass ppm or less, YI of the copolymerized PC can be easily controlled to be 3 or less. As a consequence, pellets and moldings molded of the copolymerized PC (flake powder) exhibit substantially no coloration. When the content of trihydroxy biphenyls is more than 300 mass ppm, impurities can be reduced by optimizing the cleaning conditions of the polymer.

In addition, since the content of trihydroxy biphenyls, which is detrimental for electrostatic characteristics, is small, the copolymerized PC is also a favorable material of a molding usable for electrophotographic photoreceptors. The content of trihydroxy biphenyls in the biphenols is preferably 150 mass ppm or less, more preferably 20 mass ppm or less, the most preferably 10 mass ppm or less.

In addition, in order to control YI of the copolymerized PC to be 3 or less, it is also effective to control the content of 3-tert-butyl-4,4'-dihydroxy biphenyl in biphenols to be 370 mass ppm or less, preferably 300 mass ppm or less, more preferably 30 mass ppm or less.

[Arrangement of Electrophotographic Photoreceptor]

The electrophotographic photoreceptor according to this exemplary embodiment is arranged the same as that of the first exemplary embodiment, except that the above-described copolymerized PC is used as the binder resin in the photosensitive layer.

Third Embodiment

A third exemplary embodiment of the invention will be described in detail below.

In describing this exemplary embodiment, what has been described in the above first and second exemplary embodiment(s) will not be duplicated.

[Structure of Copolymerized PC]

A copolymerized PC according to this exemplary embodiment is a polycarbonate copolymer that contains: 0.1 to 50 mol % of the monomer unit represented by the formula (1); and the monomer unit represented by the formula (2), and that exhibits YI of 3 or less (YI being obtained by measuring flake powder based on JIS K 7105).

The copolymerized PC according to this exemplary embodiment, which exhibits YI of 3 or less, is substantially transparent and colorless. In addition, the molding method of the copolymerized PC may be wet molding for applying the copolymerized PC dissolved in an ordinarily-known suitable organic solvent.

In wet molding, discoloration of the molding with the passage of time can be restrained, so that less degradation can be brought to quality of the molding. Particularly when wet molding is applied to the copolymerized PC having YI of 3 or less, the above effect that wet molding exerts is remarkable. This is presumably because a material for changing the color of the copolymerized PC into yellow under the action of light, heat, oxidizer, humidity and the like is contained therein by a relatively small amount.

When YI of the flake powder (molding material) is 3 or less, a smaller amount of impurities detrimental to the electrostatic characteristics is contained therein. Thus, when the molding molded of the copolymerized PC is applied to electrophotographic photoreceptors, increase in the residual potential after repeated use can be restrained.

When the ratio of the monomer unit represented by the formula (1) is less than 0.1 mol %, the coating agent may be whitened (gelled), or prevention of crystallization of the charge transporting layer and enhancement of printing-proof life may not be easily realized. On the other hand, when the ratio of the monomer unit is more than 50 mol %, a part of the copolymerized PC (biphenol skeleton) may be easily crystallized, thereby deteriorating transparency. Thus, such a copolymerized PC is not suitably applicable as a binder resin for electrophotographic photoreceptors. The content of the monomer unit represented by the formula (1) is preferably in a range of 1 to 40 mol %, more preferably in a range of 5 to 30 mol %.

[Manufacturing Method of Copolymerized PC]

As in the first exemplary embodiment, the copolymerized PC according to this exemplary embodiment can be easily obtained by conducting interfacial polycondensation with use of the monomer represented by the formula (3) and the monomer represented by the formula (4).

The obtained copolymerized PC contains the repeating unit(s) represented by the formula (1) and the repeating unit(s) represented by the formula (2).

As long as an object of the invention is not hampered, the copolymerized PC may contain a polycarbonate unit having a structure unit other than those of the formulae (1) and (2), or a unit having a polyester structure, a polyurethane structure, a polyether structure or a polysiloxane structure.

In addition, among the divalent phenols used as the monomer, biphenols typically contains a minute amount of impurities. By controlling, among such impurities, the content of trihydroxy biphenyls (a biphenyl compound having three phenolic hydroxyl groups in one molecule) to be 300 mass ppm or less, YI of the copolymerized PC can be easily controlled to be 3 or less. As a consequence, moldings molded of the copolymerized PC (flake powder) exhibit substantially no coloration.

In addition, since the content of trihydroxy biphenyls, which is detrimental for electrostatic characteristics, is small, the copolymerized PC is also a favorable material of a molding usable for electrophotographic photoreceptors. The content of trihydroxy biphenyls in the biphenol monomer is preferably 150 mass ppm or less, more preferably 20 mass ppm or less, the most preferably 10 mass ppm or less.

In addition, in order to control YI of the copolymerized PC to be 3 or less, it is also effective to control the content of 3-tert-butyl-4,4'-dihydroxy biphenyl in biphenol monomer to be 370 mass ppm or less, preferably 300 mass ppm or less, more preferably 30 mass ppm or less.

[Arrangement of Electrophotographic Photoreceptor]

The electrophotographic photoreceptor according to this exemplary embodiment is arranged the same as those of the first and second exemplary embodiments, except that the above-described copolymerized PC is used as the binder resin in the photosensitive layer.

Fourth Embodiment

A second exemplary embodiment of the invention will be described in detail below.

In describing this exemplary embodiment, what has been described in the above first to third exemplary embodiments will not be duplicated.

[Structure of Copolymerized PC]

The copolymerized PC according to this exemplary embodiment has the same structure as that of the first exemplary embodiment, so that description thereof will be omitted here.

[Manufacturing Method of Copolymerized PC]

For manufacturing of the copolymerized PC according to this exemplary embodiment, various methods are specifically usable. According to a usable exemplary method, polycarbonate oligomer is manufactured by reacting a divalent phenol (biphenols represented by the formula (3) and/or the bisphenols represented by the formula (4)) with phosgene, and then the polycarbonate oligomer is reacted with the above divalent phenol under the presence of a mixture of the above catalyst and an alkali aqueous solution of the above acid-binding agent. Alternatively, the above divalent phenol and phosgene may be reacted with each other in the mixture of the catalyst and the alkali aqueous solution. Usually, the former method (i.e., the method in which polycarbonate oligomer is manufactured in advance) is preferable in terms of efficiency.

In order to manufacture polycarbonate oligomer, the divalent phenol is initially dissolved in an alkali aqueous solution to prepare an alkali aqueous solution of the divalent phenol. Subsequently, phosgene is introduced into a mixture of the prepared alkali aqueous solution and an organic solvent such as methylene chloride for a reaction therein, and polycarbonate oligomer of the divalent phenol is synthesized. Then, the reaction solution is subjected to a separation into aqueous phase and organic phase, so that organic phase containing polycarbonate oligomer is obtained. At this time, alkali concentration of the alkali aqueous solution is preferably in a defined range of 0.1 to 5. A volume ratio of the organic phase to the aqueous phase is in a range of 10:1 to 1:10, preferably in a range of 5:1 to 1:5.

A reaction temperature is typically in a range of 0 to 70 degrees C. under cooling, more preferably in a range of 5 to 65 degrees C. Reaction time is in a range of 15 minutes to 4 hours, preferably 30 minutes to 3 hours. The average molecular weight of the obtained polycarbonate oligomer is 2000 or less. The polymerization degree of the polycarbonate oligomer is typically 20 or less. The polycarbonate oligomer is preferably any one of dimer to decamer.

The organic phase containing the obtained polycarbonate oligomer is added with the above divalent phenol for reaction. The reaction temperature is preferably 0 to 20 degrees C., particularly preferably 5 to 15 degrees C. Particularly by conducting the reaction at the reaction temperature of 20 degrees C. or less, coloration of the generated copolymerized PC can be restrained (i.e., increase in YI can be restrained).

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature and the like, is typically in a range of 0.5 minute to 10 hours, preferably 1 minute to 2 hours.

Further, polycondensation is preferably conducted under atmosphere of inactive gas such as nitrogen or argon. By controlling the oxygen partial pressure to be 5065 Pa (0.05 atmosphere) or less, coloration of the generated copolymerized PC can be restrained (i.e., increase in YI can be restrained). The oxygen partial pressure is more preferably 1013 Pa (0.01 atmosphere) or less.

In this exemplary embodiment, 0.0001 to 1 mol equivalent of an antioxidant is added to the reaction system per 1 mol of the biphenols represented by the formula (3). The mol equivalent herein means that, when a plurality of antioxidizing structure units are present in one molecule, each of the antioxidizing structure units is counted as 1 mol. For instance, 1 mol of a difunctional antioxidant in which two hindered phenols are bonded together in one molecule corresponds to 2 mol equivalent. The additive amount of the antioxidant is preferably 0.0002 to 0.5 mol equivalent, more preferably 0.001 to 0.1 mol equivalent, the most preferably 0.02 to 0.05 mol equivalent.

An example of the antioxidant is a reducing antioxidant such as sodium sulfite and hydrosulfite salt. Particularly, hydrosulfite salt (sodium hydrosulfite, potassium hydrosulfite) is preferable. By adding hydrosulfite salt, coloration of the generated copolymerized PC can be restrained (i.e., increase in YI can be restrained). In addition, hydrosulfite salt can prevent oxidization of the monomer and reduce the oxidized monomer for reactivity recovery, thereby contributing to efficiency of polymerization.

At the time of the reaction, the divalent phenol is preferably added in a form of an organic-solvent solution and/or an alkali aqueous solution. The order of the addition is not specifically limited. In the above manufacturing method, the catalyst, the terminal terminator, the branching agent and the like may be added as needed at the time of manufacturing polycarbonate oligomer or at the time of subsequent polymerization reaction, or both at the time of manufacturing polycarbonate oligomer and at the time of subsequent polymerization reaction.

[Arrangement of Electrophotographic Photoreceptor]

An electrophotographic photoreceptor according to this exemplary embodiment has the same arrangement as that of the first exemplary embodiment, so that description thereof will be omitted here.

EXAMPLE(S)

Next, examples and comparatives of the first to fourth exemplary embodiments according to the invention will be described in detail. However, the invention is not limited to the examples but may include various modifications and applications as long as such modifications and applications do not depart from a technical idea of the invention.

Specifically, a copolymerized PC was manufactured by conducting polycondensation with use of a predetermined bisphenol compound monomer and a biphenol compound monomer, and an electrophotographic photoreceptor was manufactured from the copolymerized PC. Subsequently, various evaluations were conducted.

Example(s) of First Embodiment

Example 1-1

(Manufacturing of Copolymerized PC)

A solution prepared by dissolving 74 g of 2,2-bis(4-hydroxyphenyl) propane (bisphenol A) in 550 ml of aqueous sodium hydroxide having a concentration of 6 mass % was mixed with 250 ml of methylene chloride. Then, while the solution was being stirred, phosgene gas was blown into the solution under cooling at 950 ml/min for 15 minutes. Subsequently, the reaction solution was separated in a stand still manner, and a methylene chloride solution of an oligomer having an organic layer of 2 to 4 polymerization degree and a chloroformate group at its molecular terminal was obtained. The obtained oligomer solution was added with methylene chloride, so that the total amount thereof became 450 ml.

Next, 24 g of 4,4'-dihydroxy biphenyl (content of trihydroxy biphenyl: 321 mass ppm, content of 3-tert-butyl-4,4'-dihydroxy biphenyl: 349 mass ppm) was dissolved in 150 ml of aqueous sodium hydroxide having a concentration of 8 mass %, and added with 3.0 g of p-tert-butylphenol as a molecular weight adjuster (biphenol aqueous solution). In this example, a commercial product was used as 4,4'-dihydroxy biphenyl without refining. A content of impurities in 4,4'-dihydroxy biphenyl was measured with a liquid chromatography.

The above oligomer solution was added with the biphenol aqueous solution for mixture. While being vigorously stirred, the mixture was added with 2 ml of triethylamine aqueous solution having a concentration of 7 mass % as a catalyst. Then, while the mixture was continuously being stirred with a temperature maintained at 28 degrees C., interfacial polycondensation was conducted for 1.5 hours. After the reaction, the reaction product was diluted with 1 liter of methylene chloride. Then, the reaction product was cleaned with 1.5 liter of water for one time and with 0.05N aqueous sodium hydroxide for one time. After the cleaning, the reaction product was checked to see that no alkali metal salt of the material monomer was present in the aqueous layer at that point. The checking was based on whether or precipitate was present with the aqueous layer being pH 3 or less. Then, the reaction product was initially cleaned with 1 liter of 0.01N acidum hydrochloricum for one time and subsequently cleaned with 1 liter of water for two times, so that a polymer solution was obtained.

Next, a container provided with a baffle having stirring vanes was separately prepared, and 2 liters of methanol was put into the container. While methanol in the container was being sufficiently stirred with the stirring vanes, 1 liter of the above polymer solution was dropped into the container at such a speed as to allow particles to be formed, and flaking processing based on reprecipitation was conducted. After the dropping was over, the stirring was continued for another 10 minutes while the stifling speed was sufficiently maintained. Then, another 2 liters of methanol was put into the container, and the stirring was continued for additional 5 minutes. By filtrating and drying the obtained flake, a copolymerized PC (PC-1-1) for evaluation was prepared.

(Evaluation of Copolymerized PC)

YI of the PC-1-1 in the original form (i.e., in the form of flake powder) was measured (based on JIS K 7105).

Then, the PC-1-1 was dissolved in methylene chloride to prepare a solution having a concentration of 0.5 g/dl. When reduced viscosity $[\eta_{sp}/C]$ thereof at 20 degrees C. was measured, the result was 0.82 dl/g. A chemical structure of the PC-1-1 was analyzed with $^1$H-NMR, and the PC-1-1 was found to be a copolymerized PC represented by the following formula (5).

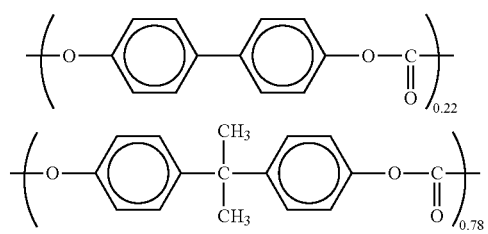

(5)

A concentration of 4,4'-dihydroxy biphenyl (4,4'-biphenol) residual in the inside of the obtained PC-1-1 was measured in the following manner.

The PC-1-1 (2.5 g) was put into a conical flask having a stopper and dissolved in 25 ml of methylene chloride. Next, an antioxidant (manufactured by Ciba Specialty Chemicals, IRGANOX™ 1010, 30 mg) was added. Then, while the solution was strongly stirred with a magnetic stirrer, 100 ml of acetone and 100 ml of hexane were sequentially and gradually added respectively for approximately 1 minute, so that a resin component was precipitated. After the precipitation was subjected to suction filtration, filtrate thereof was transferred into a condensing container. While the condensing container was soaked in hot water of 45 degrees C., nitrogen gas was blown into the container so as to volatilize the solvent, so that the precipitation was condensed. After the condensed product was dissolved in 10 ml of tetrahydrofuran, an amount of 4,4'-biphenol was measured with a HPLC (high performance liquid chromatography) in accordance with the absolute calibration curve method (manufactured by Agilent Co., Ltd., 100 series, column: manufactured by TOSOH Co., Ltd., ODS type, inner diameter of 4.6 mm, length of 25 cm). Mobile phase at the time of measuring was measured with an ultraviolet detector (280 nm) by use of a miscible system of distilled water (added with 0.1 volume % of formic acid) and acetonitrile in a gradient mode (acetonitrile concentration: 30 to 100 volume %-20 min, flow rate: 1.0 ml/min).

The concentration (mass ppm) of 4,4'-biphenol residual in the PC-1-1 was obtained in the following manner: a collection rate (%) was separately obtained with respect to a system in which a predetermined concentration of 4,4'-biphenol (pure product) was added to the resin; and a correction for effectuating "4,4'-biphenol concentration (mass ppm) measured with HPLC/(collection rate(%)/100)" was conducted.

The flake of the PC-1-1 was melt-extruded with a 50 mm φ short-screw extruder at a cylinder temperature of 280 degrees C. at a screw rotation speed of 100 rpm, to be formed into pellets. The pellets were subjected to a drying processing at 120 degrees C. for 5 hours, and subsequently injection-molded with use of a 20×50×3 mm-sized die (S55C Minor Suface #1000) into sample pieces (20×50×3 mm) for use in measurement of solid properties. YI and the overall light transmittance of the sample pieces (injection-molded pieces) were measured based on JIS K 7105. The results were evaluated based on the following criteria.

For YI of the injection-molded pieces: those exhibiting YI of 2 or less were rated as A (excellent); those exhibiting YI of 4 or less were rated as B (good); and those exhibiting YI of more than 4 were rated as C (not good).

For the overall light transmittance: those exhibiting the overall light transmittance of 89% or more were rated as B (good); and those exhibiting the overall light transmittance of less than 89% were rated as C (not good).

(Manufacturing of Electrophotographic Photoreceptor)

A film of polyethylene terephthalate resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor. Specifically, the charge generating layer and the charge transporting layer were formed in the following manner.

0.5 parts by mass of oxotitanium phthalocyanine was used as a charge generating material while 0.5 parts by mass of a butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transporting material, 0.5 g of a compound (CTM-1) represented by the following formula (6) and 0.5 g of the PC-1-1 flake were dispersed in 10 ml of tetrahydrofuran to prepare a coating agent. The coating agent was applied onto the charge generating layer with an applicator and dried, thereby providing a charge transporting layer having a film thickness of approximately 20 μm.

(6)

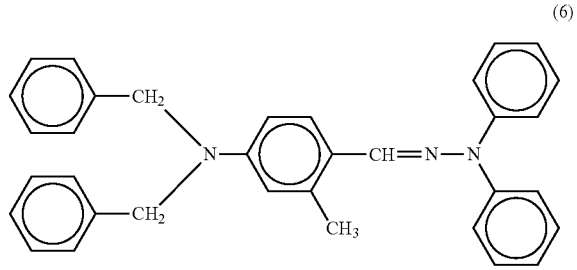

(Evaluation of Electrophotographic Photoreceptor)

Electrophotographic characteristics of the obtained electrophotographic photoreceptor were evaluated with an electrostatic charge tester EPA-8100 (manufactured by Kawaguchi Electric Works Co., Ltd.). Specifically, corona discharge of −6 kV was conducted in the static mode. Then, the initial surface potential (Vo), residual potential (initial residual potential $V_R$) in 5 seconds after light irradiation (10Lux), and half-life exposure amount (initial sensitivity, $E_{1/2}$) were measured. Further, a commercially-available printer (manufactured by Kyocera Corporation, FS-600) was modified so as to be capable of measuring the surface potential of the photoreceptor. Then, the photoreceptor was mounted on a drum to be evaluated in terms of electrification characteristics. Evaluation was conducted on electrification characteristics (increase in residual potential after repeated use ($\Delta V_R$)) exhibited after the photoreceptor was repeatedly used without interposition of toner or paper for 24 hours under a high temperature and high humidity (35 degrees C., 85% RH).

The above items each were evaluated based on the following criteria.

For the initial surface potential ($V_o$): those exhibiting the potential of −700V or less were rated as B (good); and those exhibiting the potential of more than the above value were rated as C (not good).

For the initial residual potential ($V_R$): those exhibiting the potential of −40V or more (i.e., absolute value of which was 40V or less) were rated as B (good); and those exhibiting the potential of less than the above value (i.e., absolute value of which was more than 40V) were rated as C (not good).

For the initial sensitivity ($E_{1/2}$): those exhibiting the sensitivity of 0.85 Lux·sec or less were rated as B (good); and those exhibiting the sensitivity of more than the above value were rated as C (not good).

For the increase in the residual potential after repeated use ($\Delta V_R$): those exhibiting the increase of 40V or less in the absolute value of the residual potential after repeated use were rated as B (good); and those exhibiting the increase of more than the above value were rated as C (not good).

Example 1-2

In the manufacturing of the copolymerized PC of the example 1-1, the polymer solution having been cleaned with water was added with 4,4'-dihydroxy biphenyl dissolved in acetone (manufactured by Honshu Chemical Industry Co. Ltd., content of trihydroxy biphenyl: 321 mass ppm, content of 3-tert-butyl-4,4'-dihydroxy biphenyl: 49 mass ppm). The additive amount was calculated so that 4,4'-dihydroxy biphenyl was contained at a content of 90 mass ppm of the total amount of the resin solid content (the additive amount was determined by obtaining a ratio of the amount eluted in the solvent to the amount residual in the solid content through an experiment).

Except for the above, the copolymerized PC (PC-1-2) of the example 1-2 was manufactured in the same manner as the example 1-1. Then, the PC-1-2 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-1-2 was analyzed with $^1$H-NMR, and the PC-1-2 was found to have the same structure as the PC-1-1.

The same evaluation as in the example 1-1 was conducted on the PC-1-2 and an electrophotographic photoreceptor made of the PC-1-2 in the same manner as in the example 1-1.

Example 1-3

In the manufacturing of the copolymerized PC of the example 1-1, the reaction product was cleaned with aqueous sodium hydroxide for three times. Except for the above, a copolymerized PC (PC-1-3) of the example 1-3 was manufactured in the same manner as the example 1-1. Then, the PC-1-3 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-1-3 was analyzed with $^1$H-NMR, and the PC-1-3 was found to have the same structure as the PC-1-1.

The same evaluation as in the example 1-1 was conducted on the PC-1-3 and an electrophotographic photoreceptor made of the PC-1-3 in the same manner as in the example 1-1.

Example 1-4

In the manufacturing of the copolymerized PC of the example 1-1, 87 g of 1,1-bis(4-hydroxyphenyl) cyclohexane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-1-4) of the example 1-4 was manufactured in the same manner as the example 1-1. Then, the PC-1-4 was dissolved in methylene chloride to prepare a solution having a concentration of 0.5 g/dl. When reduced viscosity [$\eta_{sp}$/C] thereof at 20 degrees C. was measured, the result was 0.83 dl/g. A chemical structure of the PC-1-4 was analyzed with $^1$H-NMR, and the PC-1-4 was found to be a copolymerized PC represented by the following formula (7). The same evaluation as in the example 1-1 was conducted on the PC-1-4 and an electrophotographic photoreceptor made of the PC-1-4 in the same manner as in the example 1-1.

(7)

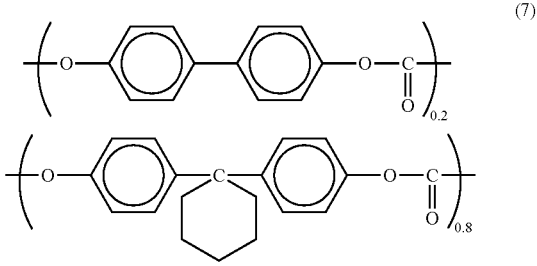

Example 1-5

In the manufacturing of the copolymerized PC of the example 1-1, 69 g of 1,1-bis(4-hydroxyphenyl) ethane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-1-5) of the example 1-5 was manufactured in the same manner as the example 1-1. Then, the PC-5 was dissolved in methylene chloride to prepare a solution having a concentration of 0.5 g/dl. When reduced viscosity [$\eta_{sp}/C$] thereof at 20 degrees C. was measured, the result was 0.83 dl/g. A chemical structure of the PC-1-5 was analyzed with $^1$H-NMR, and the PC-1-5 was found to be a copolymerized PC represented by the following formula (8). The same evaluation as in the example 1-1 was conducted on the PC-1-5 and an electrophotographic photoreceptor made of the PC-1-5 in the same manner as in the example 1-1.

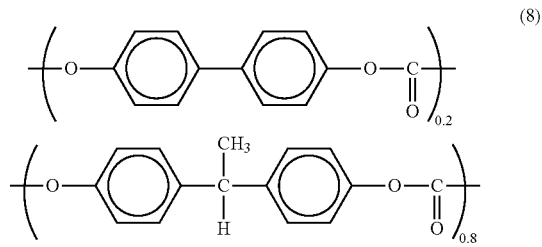

(8)

Example 1-6

In the manufacturing of the copolymerized PC of the example 1-1, 79 g of 2,2-bis(4-hydroxyphenyl) butane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-1-6) of the example 1-6 was manufactured in the same manner as the example 1-1. Then, the PC-1-6 was dissolved in methylene chloride to prepare a solution having a concentration of 0.5 g/dl. When reduced viscosity [$\eta_{sp}/C$] thereof at 20 degrees C. was measured, the result was 0.82 dl/g. A chemical structure of the PC-1-6 was analyzed with $^1$H-NMR, and the PC-1-6 was found to be a copolymerized PC represented by the following formula (9). The same evaluation as in the example 1-1 was conducted on the PC-1-6 and an electrophotographic photoreceptor made of the PC-1-6 in the same manner as in the example 1-1.

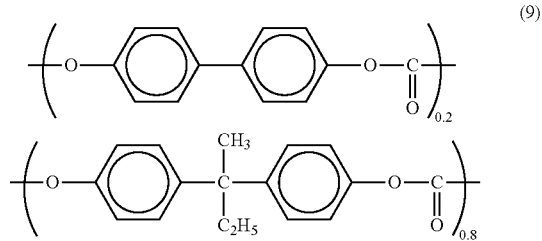

(9)

Example 1-7

In the manufacturing of the copolymerized PC of the example 1-1, 83 g of 2,2-bis (3-methyl-4-hydroxyphenyl) propane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-1-7) of the example 1-7 was manufactured in the same manner as the example 1-1. Then, the PC-1-7 was dissolved in methylene chloride to prepare a solution having a concentration of 0.5 g/dl. When reduced viscosity [$\eta_{sp}/C$] thereof at 20 degrees C. was measured, the result was 0.82 dl/g. A chemical structure of the PC-1-7 was analyzed with $^1$H-NMR, and the PC-1-7 was found to be a copolymerized PC represented by the following formula (10). The same evaluation as in the example 1-1 was conducted on the PC-1-7 and an electrophotographic photoreceptor made of the PC-1-7 in the same manner as in the example 1-1.

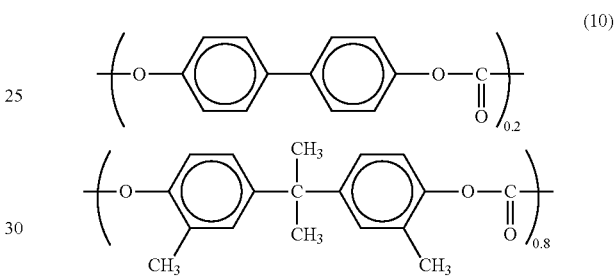

(10)

[Comparative 1-1]

In the manufacturing of the copolymerized PC of the example 1-1, the polymer solution diluted with methylene chloride was sequentially cleaned with 1.5 liter of water for two times, 1 liter of 0.01N acidum hydrochloricum for one time and 1 liter of water for two times in this order after the polycondensation was over. Except for the above, a copolymerized PC (PC-1-8) of the comparative 1-1 was manufactured in the same manner as the example 1-1. Then, the PC-1-8 was dissolved in methylene chloride to prepare a solution having a concentration of 0.5 g/dl. When reduced viscosity [$\eta_{sp}/C$] thereof at 20 degrees C. was measured, the result was 0.83 dl/g. A chemical structure of the PC-8 was analyzed with $^1$H-NMR, and the PC-1-8 was found to have the same structure as the PC-1-1.

The same evaluation as in the example 1-1 was conducted on the PC-1-8 and an electrophotographic photoreceptor made of the PC-1-8 in the same manner as in the example 1-1.

[Evaluation Result]

Tables 1 and 2 show evaluation results of the examples 1-1 to 1-7 and the comparative 1-1.

TABLE 1

| | Copolymerized PC | | | |
| --- | --- | --- | --- | --- |
| | Residual Amount of 4,4'-biphenyl (mass ppm) | YI of Flake | YI of Injection- Molded Piece | Overall Light Transmittance |
| Example 1-1 (PC-1-1) | 53 | 3.0 | 3(B) | B |
| Example 1-2 (PC-1-2) | 87 | 3.0 | 3(B) | B |

TABLE 1-continued

| | Copolymerized PC | | | |
|---|---|---|---|---|
| | Residual Amount of 4,4'-biphenyl (mass ppm) | YI of Flake | YI of Injection-Molded Piece | Overall Light Transmittance |
| Example 1-3 (PC-1-3) | 7 | 2.3 | 2(A) | B |
| Example 1-4 (PC-1-4) | 55 | 3.0 | 3(B) | B |
| Example 1-5 (PC-1-5) | 52 | 3.0 | 3(B) | B |
| Example 1-6 (PC-1-6) | 53 | 3.0 | 3(B) | B |
| Example 1-7 (PC-1-7) | 59 | 3.0 | 3(B) | B |
| Comparative 1-1 (PC-1-8) | 99 | 4.1 | 7(C) | C |

TABLE 2

| | Electrophotographic Photoreceptor | | | |
|---|---|---|---|---|
| | Initial Surface Potential (Vo)(V) | Initial Residual Potential ($V_R$)(V) | Initial Sensitivity ($E_{1/2}$)(lux·sec) | Increase in Residual Potential After Repeated Use ($\Delta V_R$)(V) |
| Example 1-1 (PC-1-1) | −720 B | −30(B) | 0.84(B) | 40(B) |
| Example1-2 (PC-1-2) | −720 B | −30(B) | 0.84(B) | 40(B) |
| Example1-3 (PC-1-3) | −720 B | −20(B) | 0.82(B) | 30(B) |
| Example1-4 (PC-1-4) | −720 B | −30(B) | 0.84(B) | 40(B) |
| Example1-5 (PC-1-5) | −720 B | −30(B) | 0.84(B) | 40(B) |
| Example1-6 (PC-1-6) | −720 B | −30(B) | 0.84(B) | 40(B) |
| Example1-7 (PC-1-7) | −720 B | −30(B) | 0.84(B) | 40(B) |
| Comparative 1-1 (PC-1-8) | −720 B | −40(B) | 0.84(B) | 50(C) |

Example(s) of Second Embodiment

Next, examples and comparatives of the second exemplary embodiment according to the invention will be described in detail.

Example 2-1

(Manufacturing of Copolymerized PC)

A solution prepared by dissolving 74 g of 2,2-bis(4-hydroxyphenyl) propane (bisphenol A) in 550 ml of aqueous sodium hydroxide having a concentration of 6 mass % was mixed with 250 ml of methylene chloride. Then, while the solution was being stirred, phosgene gas was blown into the solution under cooling at 950 ml/min for 15 minutes. Subsequently, the reaction solution was separated in a stand still manner, and a methylene chloride solution of an oligomer having an organic layer of 2 to 4 polymerization degree and a chloroformate group at its molecular terminal was obtained. The obtained oligomer solution was added with methylene chloride, so that the total amount thereof became 450 ml.

Then, 24 g of 4,4'-dihydroxy biphenyl (content of trihydroxy biphenyl: 321 mass ppm, content of 3-tert-butyl-4,4'-dihydroxy biphenyl: 49 mass ppm) was dissolved in 150 ml of aqueous sodium hydroxide having a concentration of 8 mass %, and added with 3.0 g of p-tert-butylphenol as a molecular weight adjuster (biphenol aqueous solution).

In this example, a commercial product was used as 4,4'-dihydroxy biphenyl without refining. A content of impurities in 4,4'-dihydroxy biphenyl was measured with a liquid chromatography.

The above oligomer solution was added with the biphenol aqueous solution for mixture. While being vigorously stirred, the mixture was added with 2 ml of triethylamine aqueous solution having a concentration of 7 mass % as a catalyst. Then, while the mixture was continuously being stirred with a temperature maintained at 28 degrees C., interfacial polycondensation was conducted for 1.5 hours. After the reaction, the reaction product was diluted with 1 liter of methylene chloride. Then, the reaction product was cleaned with 1.5 liter of water for one time, with 1 liter of 0.05N aqueous sodium hydroxide for two times, with 1 liter of 0.01N acidum hydrochloricum for one time and with 1 liter of water for two times in this order, and a polymer solution was obtained.

Next, a container provided with a baffle having stirring vanes was separately prepared, and 2 liters of methanol was put into the container. While methanol in the container was being sufficiently stirred with the stirring vanes, 1 liter of the above polymer solution was dropped into the container at such a speed as to allow particles to be formed, and flaking processing based on reprecipitation was conducted. After the dropping was over, the stirring was continued for another 10 minutes while the stifling speed was sufficiently maintained. Then, another 2 liters of methanol was put into the container, and the stirring was continued for additional 5 minutes. By filtrating and drying the obtained flake, a copolymerized PC (PC-2-1) for evaluation was prepared.

(Evaluation of Copolymerized PC)

YI of the PC-2-1 in the original form (i.e., in the form of flake powder) was measured (based on JIS K 7105).

Then, the PC-2-1 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-2-1 was analyzed with $^1$H-NMR, and the PC-2-1 was found to be a copolymerized PC represented by the following formula (5).

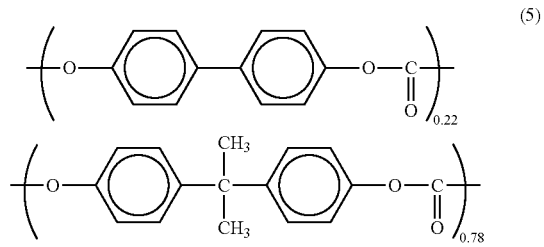

A concentration of 3,4,4'-trihydroxy biphenyl residual in the inside of the obtained PC-2-1 was measured in the following manner.

The PC-2-1 (5.0 g) was put into a conical flask having a stopper and dissolved in 50 ml of methylene chloride. Next, an antioxidant (manufactured by Ciba Specialty Chemicals, IRGANOX™ 1010, 60 mg) was added. Then, while the solution was strongly stirred with a magnetic stirrer, 200 ml of acetone and 200 ml of hexane were sequentially and gradually added respectively for approximately 2 minute, so that a resin component was precipitated. After the precipitation was subjected to suction filtration, filtrate thereof was transferred into a condensing container. While the condensing container was soaked in hot water of 45 degrees C., nitrogen gas was blown into the container so as to volatilize the solvent, so that the precipitation was condensed. After the condensed product was dissolved in 5 ml of tetrahydrofuran, an amount of 3,4,4'-trihydroxy biphenol was measured with a HPLC (high performance liquid chromatography) in accordance with the absolute calibration curve method (manufactured by Agilent Co., Ltd., 1100 series, column: manufactured by TOSOH Co., Ltd., ODS type, inner diameter of 4.6 mm, length of 25 cm). Mobile phase at the time of measuring was measured with an ultraviolet detector (260 nm) by use of a miscible system of distilled water (added with 0.1 volume % of formic acid) and acetonitrile in a gradient mode (acetonitrile concentration: 32 volume % (0 to 14 minutes) to 100 volume % (20 to 40 minutes, flow rate: 1.0 ml/min)).

The concentration (mass ppm) of 3,4,4'-trihydroxy biphenyl residual in the PC-2-1 was obtained in the following manner: a collection rate (%) was separately obtained with respect to a system in which a predetermined concentration of 3,4,4'-trihydroxy biphenyl (pure product) was added to the resin; and a correction for effectuating "3,4,4'-tryhydroxy biphenyl concentration (mass ppb) measured with HPLC/(collection rate(%)/100)" was conducted.

The flake of the PC-2-1 was melt-extruded with a 50 mm φ short-screw extruder at a cylinder temperature of 280 degrees C. at a screw rotation speed of 100 rpm, and formed into pellets. The pellets were subjected to a drying processing at 120 degrees C. for 5 hours, and subsequently injection-molded with use of a 20×50×3 mm-sized die (S55C Minor Suface #1000) into sample pieces (20×50×3 mm) for use in measurement of solid properties. YI and the overall light transmittance of the sample pieces (injection-molded pieces) were measured based on JIS K 7105. The results were evaluated based on the following criteria.

For YI of the injection-molded pieces: those exhibiting YI of 2 or less were rated as A (excellent); those exhibiting YI of 4 or less were rated as B (good); and those exhibiting YI of more than 4 were rated as C (not good).

For the overall light transmittance: those exhibiting the overall light transmittance of 89% or more were rated as B (good); and those exhibiting the overall light transmittance of less than 89% were rated as C (not good).

(Manufacturing of Electrophotographic Photoreceptor)

An electrophotographic photoreceptor of this example was manufactured in the same manner as the example 1-1 of the first exemplary embodiment. Thus, description therefor will be omitted.

(Evaluation of Electrophotographic Photoreceptor)

The same evaluation as the example 1-1 of the first exemplary embodiment was conducted on the electrophotographic photoreceptor of this example. Thus, description therefor will be omitted.

Example 2-2

In the manufacturing of the copolymerized PC of the example 2-1, the polymer solution having been cleaned with water was added with 3,4,4'-trihydroxy biphenyl dissolved in acetone. The additive amount was calculated so that 3,4,4'-trihydroxy biphenyl was contained at a content of 150 mass ppb of the total amount of the resin solid content. Specifically, resins to which different additive amounts were respectively applied were measured to obtain the residual amount of 3,4,4'-trihydroxy biphenyl. Among the resins, a resin in 3,4,4'-trihydroxy biphenyl was contained at the content of 150 mass ppb was selected as a sample for evaluation.

Except for the above, the copolymerized PC (PC-2-2) of the example 2-2 was manufactured in the same manner as the example 2-1. Then, the PC-2-2 was dissolved in methylene chloride to prepare a solution having a concentration of 0.5 g/dl. When reduced viscosity $[\eta_{sp}/C]$ thereof at 20 degrees C. was measured, the result was 0.82 dl/g. A chemical structure of the PC-2-2 was analyzed with $^1$H-NMR, and the PC-2-2 was found to have the same structure as the PC-2-1.

The same evaluation as in the example 2-1 was conducted on the PC-2-2 and an electrophotographic photoreceptor made of the PC-2-2 in the same manner as in the example 2-1.

Example 2-3

In the manufacturing of the copolymerized PC of the example 2-1, 87 g of 1,1-bis(4-hydroxyphenyl) cyclohexane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-2-3) of the example 2-3 was manufactured in the same manner as the example 2-1. Then, the PC-2-3 was dissolved in methylene chloride to prepare a solution having a concentration of 0.5 g/dl. When reduced viscosity $[\eta_{sp}/C]$ thereof at 20 degrees C. was measured, the result was 0.83 dl/g. A chemical structure of the PC-2-3 was analyzed with $^1$H-NMR, and the PC-2-3 was found to be a copolymerized PC represented by the following formula (7). The same evaluation as in the example 2-1 was conducted on the PC-2-3 and an electrophotographic photoreceptor made of the PC-2-3 in the same manner as in the example 2-1.

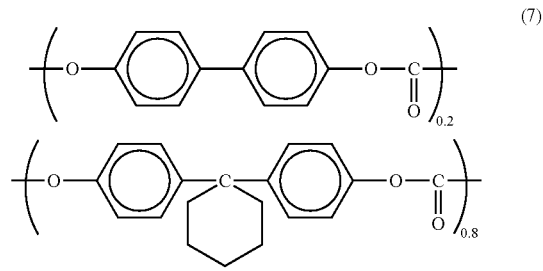

(7)

Example 2-4

In the manufacturing of the copolymerized PC of the example 2-1, 69 g of 1,1-bis(4-hydroxyphenyl) ethane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-2-4) of the example 2-4 was manufactured in the same manner as the example 2-1. Then, the PC-2-4 was dissolved in methylene chloride to prepare a solution having a concentration of 0.5 g/dl. When reduced viscosity $[\eta_{sp}/C]$ thereof at 20 degrees C. was measured, the result was 0.83 dl/g. A chemical structure of the PC-2-4 was analyzed with $^1$H-NMR, and the PC-2-4 was found to be a copolymerized PC represented by the following formula (8). The same evaluation as in the example 2-1 was conducted on the PC-2-4 and an electrophotographic photoreceptor made of the PC-2-4 in the same manner as in the example 2-1.

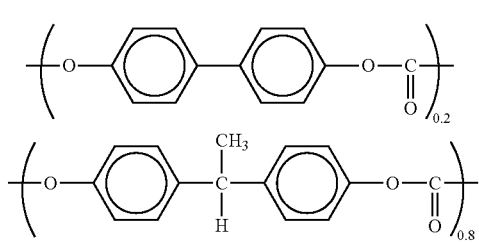

(8)

Example 2-5

In the manufacturing of the copolymerized PC of the example 2-1, 79 g of 2,2-bis(4-hydroxyphenyl) butane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-2-5) of the example 2-5 was manufactured in the same manner as in the example 2-1. Then, the PC-2-5 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-2-5 was analyzed with $^1$H-NMR, and the PC-2-5 was found to be a copolymerized PC represented by the following formula (9). The same evaluation as in the example 2-1 was conducted on the PC-2-5 and an electrophotographic photoreceptor made of the PC-2-5 in the same manner as in the example 2-1.

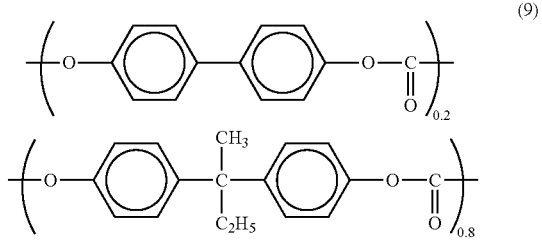

(9)

Example 2-6

In the manufacturing of the copolymerized PC of the example 2-1, 83 g of 2,2-bis (3-methyl-4-hydroxyphenyl) propane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-2-6) of the example 2-6 was manufactured in the same manner as the example 2-1. Then, the PC-2-6 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-2-6 was analyzed with $^1$H-NMR, and the PC-2-6 was found to be a copolymerized PC represented by the following formula (10). The same evaluation as in the example 2-1 was conducted on the PC-2-6 and an electrophotographic photoreceptor made of the PC-2-6 in the same manner as in the example 2-1.

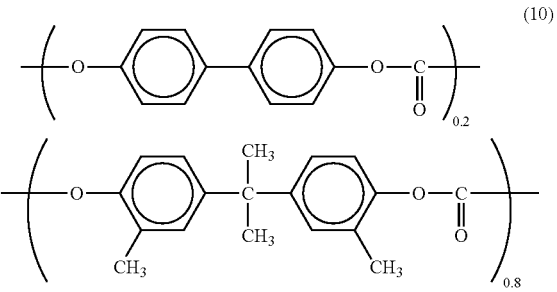

(10)

Example 2-7

In the manufacturing of the copolymerized PC of the example 2-1, the reaction product was cleaned with aqueous sodium hydroxide for three times. Except for the above, a copolymerized PC (PC-2-7) of the example 2-7 was manufactured in the same manner as the example 2-1. Then, the PC-2-7 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-2-7 was analyzed with $^1$H-NMR, and the PC-2-7 was found to have the same structure as the PC-2-1.

The same evaluation as in the example 2-1 was conducted on the PC-2-7 and an electrophotographic photoreceptor made of the PC-2-7 in the same manner as in the example 2-1.

[Comparative 2-1]

In the manufacturing of the copolymerized PC of the example 2-1, the polymer solution diluted with methylene chloride was sequentially cleaned with 1.5 liter of water for two times, 1 liter of 0.01N acidum hydrochloricum for one time and 2 liters of water for two times in this order after the polycondensation was over. Except for the above, a copolymerized PC (PC-2-8) of the comparative 2-1 was manufactured in the same manner as the example 2-1. Then, the PC-2-8 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-2-8 was analyzed with $^1$H-NMR, and the PC-2-8 was found to have the same structure as the PC-2-1.

The same evaluation as in the example 2-1 was conducted on the PC-2-8 and an electrophotographic photoreceptor made of the PC-2-8 in the same manner as in the example 2-1.

[Evaluation Result]

Tables 3 and 4 show evaluation results of the examples 2-1 to 2-7 and the comparative 2-1.

TABLE 3

| | Copolymerized PC | | | |
| --- | --- | --- | --- | --- |
| | Residual Amount of Trihydroxy biphenyl (mass ppm) | YI of Flake | YI of Injection-Molded Piece | Overall Light Transmittance |
| Example 2-1 (PC-2-1) | 100 | 2.9 | 3(B) | B |

TABLE 3-continued

| | Copolymerized PC | | | |
|---|---|---|---|---|
| | Residual Amount of Trihydroxy biphenyl (mass ppm) | YI of Flake | YI of Injection-Molded Piece | Overall Light Transmittance |
| Example 2-2 (PC-2-2) | 150 | 3.1 | 4(B) | B |
| Example 2-3 (PC-2-3) | 100 | 2.9 | 3(B) | B |
| Example 2-4 (PC-2-4) | 100 | 2.9 | 3(B) | B |
| Example 2-5 (PC-2-5) | 100 | 2.9 | 3(B) | B |
| Example 2-6 (PC-2-6) | 100 | 3.0 | 3(B) | B |
| Example 2-7 (PC-2-7) | 80 | 2.3 | 2(A) | B |
| Comparative 2-1 (PC-2-8) | 210 | 4.1 | 7(C) | C |

TABLE 4

| | Electrophotographic Photoreceptor | | | |
|---|---|---|---|---|
| | Initial Surface Potential (Vo)(V) | Initial Residual Potential ($V_R$)(V) | Initial Sensitivity ($E_{1/2}$)(lux·sec) | Increase in Residual Potential After Repeated Use ($\Delta V_R$)(V) |
| Example 2-1 (PC-2-1) | −720 B | −30(B) | 0.84(B) | 40(B) |
| Example 2-2 (PC-2-2) | −720 B | −30(B) | 0.84(B) | 40(B) |
| Example 2-3 (PC-2-3) | −720 B | −30(B) | 0.84(B) | 40(B) |
| Example 2-4 (PC-2-4) | −720 B | −30(B) | 0.84(B) | 40(B) |
| Example 2-5 (PC-2-5) | −720 B | −30(B) | 0.84(B) | 40(B) |
| Example 2-6 (PC-2-6) | −720 B | −30(B) | 0.84(B) | 40(B) |
| Example 2-7 (PC-2-7) | −720 B | −20(B) | 0.82(B) | 30(B) |
| Comparative 2-1 (PC-2-8) | −720 B | −40(B) | 0.84(B) | 90(C) |

Example(s) of Third Embodiment

Next, examples and comparatives of the third exemplary embodiment according to the invention will be described in detail.

Example 3-1

(Manufacturing of Copolymerized PC)

A solution prepared by dissolving 74 g of 2,2-bis(4-hydroxyphenyl) propane (bisphenol A) in 550 ml of aqueous sodium hydroxide having a concentration of 6 mass % was mixed with 250 ml of methylene chloride. Then, while the solution was being stirred, phosgene gas was blown into the solution under cooling at 950 ml/min for 15 minutes. Subsequently, the reaction solution was separated in a stand still manner, and a methylene chloride solution of an oligomer having an organic layer of 2 to 4 polymerization degree and a chloroformate group at its molecular terminal was obtained. The obtained oligomer solution was added with methylene chloride, so that the total amount thereof became 450 ml.

Then, 24 g of 4,4'-dihydroxy biphenyl (content of trihydroxy biphenyl: 131 mass ppm, content of 3-tert-butyl-4,4'-dihydroxy biphenyl: 347 mass ppm) was dissolved in 150 ml of aqueous sodium hydroxide having a concentration of 8 mass % (aqueous solution of biphenol).

4,4'-dihydroxy biphenyl used in this example was obtained by: synthesizing 4,4'-dihydroxy biphenyl (content of trihydroxy biphenyl: 276 mass ppm, content of 3-tert-butyl-4,4'-dihydroxy biphenyl: 370 mass ppm) from a product formed by recrystallizing and refining phenol (material) with methanol; and further recrystallizing the synthesized 4,4'-dihydroxy biphenyl.

The above oligomer solution was added with 3.0 g of p-tert-butyl phenol as a molecular weight adjuster and then added with the biphenol aqueous solution for mixture. While being vigorously stirred, the mixture was added with 2 ml of triethylamine aqueous solution having a concentration of 7 mass % as a catalyst. Then, while the mixture was continuously being stirred with a temperature maintained at 28 degrees C., interfacial polycondensation was conducted for 1.5 hours. After the reaction, the reaction product was diluted with 1 liter of methylene chloride. Then, the reaction product was cleaned with 1.5 liter of water for two times, with 1 liter of 0.01N acidum hydrochloricum for one time and with 1 liter of water for two times in this order, and a polymer solution was obtained.

Next, a container provided with a baffle having stirring vanes was separately prepared, and 2 liters of methanol was put into the container. While methanol in the container was being sufficiently stirred with the stirring vanes, 1 liter of the above polymer solution was dropped into the container at such a speed as to allow particles to be formed, and flaking processing based on reprecipitation was conducted. After the dropping was over, the stirring was continued for another 10 minutes while the stirring speed was sufficiently maintained. Then, another 2 liters of methanol was put into the container, and the stirring was continued for additional 5 minutes. By filtrating and drying the obtained flake, a copolymerized PC (PC-3-1) for evaluation was prepared.

(Evaluation of Copolymerized PC)

YI of the PC-3-1 in the original form (i.e., in the form of flake powder) was measured (based on JIS K 7105).

Then, the PC-3-1 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-3-1 was analyzed with $^1$H-NMR, and the PC-3-1 was found to be a copolymerized PC represented by the following formula (5).

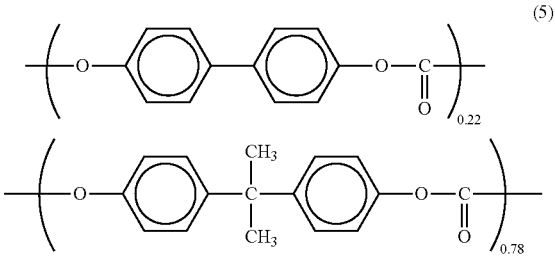

(5)

The flake of the PC-3-1 was subjected to wet cast molding with use of THF as a catalyst, and 0.1 mm-thick film was obtained. The overall light transmittance of the obtained film was measured (based on JIS K 7105). For the overall light transmittance: those exhibiting the overall light transmittance of 89% or more were rated as B (good); and those exhibiting the overall light transmittance of less than 89% were rated as C (not good). This is because, when a film exhibiting the overall light transmittance of less than 89% is used as an optical material, the reduced amount of transmitted light poses problem(s).

(Manufacturing of Electrophotographic Photoreceptor)

An electrophotographic photoreceptor of this example was manufactured in the same manner as the example 1-1 of the first exemplary embodiment. Thus, description therefor will be omitted.

(Evaluation of Electrophotographic Photoreceptor)

The same evaluation as the example 1-1 of the first exemplary embodiment was conducted on the electrophotographic photoreceptor of this example. Thus, description therefor will be omitted.

Example 3-2

In the manufacturing of the copolymerized PC of the example 3-1, 24 g of 4,4'-dihydroxy biphenyl (content of trihydroxy biphenyl: 276 mass ppm, content of 3-tert-butyl-4,4'-dihydroxy biphenyl: 370 mass ppm) that was obtained by synthesizing the product formed by recrystallizing and refining phenol (material) with methanol was used as the biphenyl compound for the copolymerization monomer. Except for the above, a copolymerized PC (PC-3-2) of the example 3-2 was manufactured in the same manner as the example 3-1. Then, the PC-3-2 was dissolved in methylene chloride to prepare a solution having a concentration of 0.5 g/dl. When reduced viscosity [$\eta_{sp}/C$] thereof at 20 degrees C. was measured, the result was 0.82 dl/g. A chemical structure of the PC-3-2 was analyzed with $^1$H-NMR, and the PC-3-2 was found to have the same structure as the PC-3-1.

The same evaluation as in the example 3-1 was conducted on the PC-3-2 and an electrophotographic photoreceptor made of the PC-3-2 in the same manner as in the example 3-1.

Example 3-3

In the manufacturing of the copolymerized PC of the example 3-1, 24 g of 4,4'-dihydroxy biphenyl (content of trihydroxy biphenyl: 15 mass ppm, content of 3-tert-butyl-4,4'-dihydroxy biphenyl: 206 mass ppm) that was obtained by: synthesizing a product formed by distilling and refining phenol (material); and further recrystallizing the synthesized product with methanol was used as the biphenyl compound for the copolymerization monomer. Except for the above, a copolymerized PC (PC-3-3) of the example 3-3 was manufactured in the same manner as the example 3-1. Then, the PC-3-3 was dissolved in methylene chloride to prepare a solution having a concentration of 0.5 g/dl. When reduced viscosity [$\eta_{sp}/C$] thereof at 20 degrees C. was measured, the result was 0.82 dl/g. A chemical structure of the PC-3-3 was analyzed with $^1$H-NMR, and the PC-3-3 was found to have the same structure as the PC-3-1.

The same evaluation as in the example 3-1 was conducted on the PC-3-3 and an electrophotographic photoreceptor made of the PC-3-3 in the same manner as in the example 3-1.

Example 3-4

In the manufacturing of the copolymerized PC of the example 3-1, 24 g of 4,4'-dihydroxy biphenyl (content of trihydroxy biphenyl: 10 mass ppm, content of 3-tert-butyl-4,4'-dihydroxy biphenyl: 266 mass ppm) that was obtained by synthesizing the product formed by distilling and refining phenol (material) was used as the biphenyl compound for the copolymerization monomer. Except for the above, a copolymerized PC (PC-3-4) of the example 3-4 was manufactured in the same manner as the example 3-1. Then, the PC-3-4 was dissolved in methylene chloride to prepare a solution having a concentration of 0.5 g/dl. When reduced viscosity [$\eta_{sp}/C$] thereof at 20 degrees C. was measured, the result was 0.82 dl/g. A chemical structure of the PC-3-4 was analyzed with $^1$H-NMR, and the PC-3-4 was found to have the same structure as the PC-3-1.

The same evaluation as in the example 3-1 was conducted on the PC-3-4 and an electrophotographic photoreceptor made of the PC-3-4 in the same manner as in the example 3-1.

Example 3-5

In the manufacturing of the copolymerized PC of the example 3-1, 24 g of a product obtained by recrystallizing 4,4'-dihydroxy biphenyl manufactured by Honshu Chemical Industry Co. Ltd. (content of trihydroxy biphenyl: 8 mass ppm, content of 3-tert-butyl-4,4'-dihydroxy biphenyl: 23 mass ppm) with acetone was used as the biphenyl compound for the copolymerization monomer. Except for the above, a copolymerized PC (PC-3-5) of the example 3-5 was manufactured in the same manner as the example 3-1. Then, the PC-5 was dissolved in methylene chloride to prepare a solution having a concentration of 0.5 g/dl. When reduced viscosity [$\eta_{sp}/C$] thereof at 20 degrees C. was measured, the result was 0.83 dl/g. A chemical structure of the PC-3-5 was analyzed with $^1$H-NMR, and the PC-3-5 was found to have the same structure as the PC-3-1.

The same evaluation as in the example 3-1 was conducted on the PC-3-5 and an electrophotographic photoreceptor made of the PC-3-5 in the same manner as in the example 3-1.

Example 3-6

In the manufacturing of the copolymerized PC of the example 3-1, the same 4,4'-dihydroxy biphenyl as the example 3-2 was used as the biphenyl compound for the copolymerization monomer, 87 g of 1,1-bis(4-hydroxyphenyl) cyclohexane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-3-6) of the example 3-6 was manufactured in the same manner as the example 3-1. Then, the PC-3-6 was dissolved in methylene chloride to prepare a solution having a concentration of 0.5 g/dl. When reduced viscosity [$\eta_{sp}/C$] thereof at 20 degrees C. was measured, the result was 0.83 dl/g. A chemical structure of the PC-3-6 was analyzed with $^1$H-NMR, and the PC-3-6 was found to be a copolymerized PC represented by the following formula (7). The same evaluation as in the example 3-1 was conducted on the PC-3-6 and an electrophotographic photoreceptor made of the PC-3-6 in the same manner as in the example 3-1.

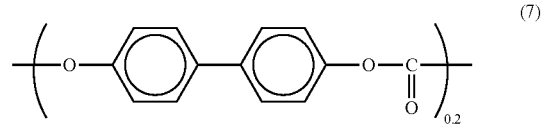

(7)

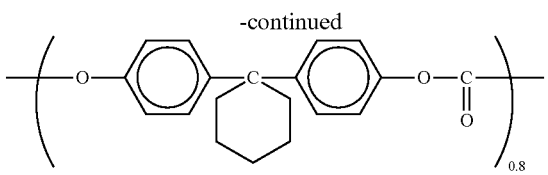

Example 3-7

In the manufacturing of the copolymerized PC of the example 3-1, the same 4,4'-dihydroxy biphenyl as the example 3-2 was used as the biphenyl compound for the copolymerization monomer, 69 g of 1,1-bis(4-hydroxyphenyl) ethane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-3-7) of the example 3-7 was manufactured in the same manner as the example 3-1. Then, the PC-3-7 was dissolved in methylene chloride to prepare a solution having a concentration of 0.5 g/dl. When reduced viscosity $[\eta_{sp}/C]$ thereof at 20 degrees C. was measured, the result was 0.83 dl/g. A chemical structure of the PC-3-7 was analyzed with $^1$H-NMR, and the PC-3-7 was found to be a copolymerized PC represented by the following formula (8). The same evaluation as in the example 3-1 was conducted on the PC-3-7 and an electrophotographic photoreceptor made of the PC-3-7 in the same manner as in the example 3-1.

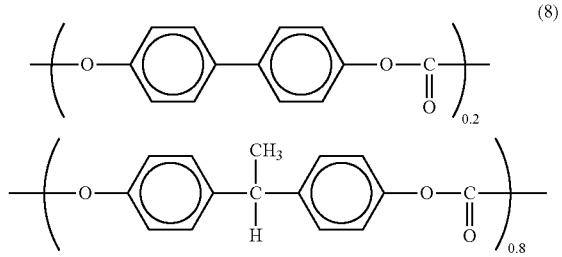

(8)

Example 3-8

In the manufacturing of the copolymerized PC of the example 3-1, the same 4,4'-dihydroxy biphenyl as the example 3-2 was used as the biphenyl compound for the copolymerization monomer, 79 g of 2,2-bis(4-hydroxyphenyl) butane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-3-8) of the example 3-8 was manufactured in the same manner as the example 3-1. Then, the PC-3-8 was dissolved in methylene chloride to prepare a solution having a concentration of 0.5 g/dl. When reduced viscosity $[\eta_{sp}/C]$ thereof at 20 degrees C. was measured, the result was 0.82 dl/g. A chemical structure of the PC-3-8 was analyzed with $^1$H-NMR, and the PC-3-8 was found to be a copolymerized PC represented by the following formula (9). The same evaluation as in the example 3-1 was conducted on the PC-3-8 and an electrophotographic photoreceptor made of the PC-3-8 in the same manner as in the example 3-1.

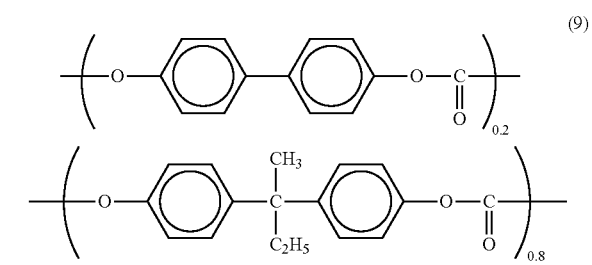

(9)

Example 3-9

In the manufacturing of the copolymerized PC of the example 3-1, the same 4,4'-dihydroxy biphenyl as the example 3-2 was used as the biphenyl compound for the copolymerization monomer, 83 g of 2,2-bis(3-methyl-4-hydroxyphenyl) propane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-3-9) of the example 3-9 was manufactured in the same manner as the example 3-1. Then, the PC-3-9 was dissolved in methylene chloride to prepare a solution having a concentration of 0.5 g/dl. When reduced viscosity $[\eta_{sp}/C]$ thereof at 20 degrees C. was measured, the result was 0.83 dl/g. A chemical structure of the PC-3-9 was analyzed with $^1$H-NMR, and the PC-3-9 was found to be a copolymerized PC represented by the following formula (10). The same evaluation as in the example 3-1 was conducted on the PC-3-9 and an electrophotographic photoreceptor made of the PC-3-9 in the same manner as in the example 3-1.

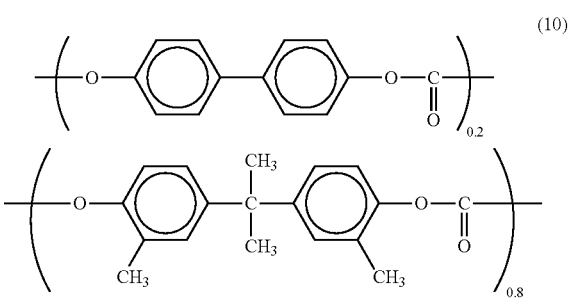

(10)

[Comparative 3-1]

24 g of 4,4'-dihydroxy biphenyl manufactured by Honshu Chemical Industry Co. Ltd. (content of trihydroxy biphenyl: 321 mass ppm, content of 3-tert-butyl-4,4'-dihydroxy biphenyl: 49 mass ppm) was used as the biphenyl compound for the copolymerization monomer. Except for the above, a copolymerized PC (PC-3-10) of the comparative 3-1 was manufactured in the same manner as the example 3-1. Then, the PC-3-10 was dissolved in methylene chloride to prepare a solution having a concentration of 0.5 g/dl. When reduced viscosity $[\eta_{sp}/C]$ thereof at 20 degrees C. was measured, the result was 0.83 dl/g. A chemical structure of the PC-3-10 was analyzed with ¹H-NMR, and the PC-3-10 was found to have the same structure as the PC-3-1.

The same evaluation as in the example 3-1 was conducted on the PC-3-10 and an electrophotographic photoreceptor made of the PC-3-10 in the same manner as in the example 3-1.

[Evaluation Result]

Tables 5 and 6 show evaluation results of the examples 3-1 to 3-9 and the comparative 3-1.

TABLE 5

|  | YI of Flake | Overall Light Transmittance |
|---|---|---|
| Example 3-1(PC-3-1) | 2.2 | B |
| Example 3-2(PC-3-2) | 2.4 | B |
| Example 3-3(PC-3-3) | 2.0 | B |
| Example 3-4(PC-3-4) | 2.1 | B |
| Example 3-5(PC-3-5) | 1.2 | B |
| Example 3-6(PC-3-6) | 2.2 | B |
| Example 3-7(PC-3-7) | 2.2 | B |
| Example 3-8(PC-3-8) | 2.2 | B |
| Example 3-9(PC-3-9) | 2.2 | B |
| Comparative 3-1(PC-3-10) | 4.1 | C |

TABLE 6

| | Electrophotographic Photoreceptor | | | |
|---|---|---|---|---|
| | Initial Surface Potential (Vo)(V) | Initial Residual Potential ($V_R$)(V) | Initial Sensitivity ($E_{1/2}$)(lux·sec) | Increase in Residual Potential After Repeated Use ($\Delta V_R$)(V) |
| Example 3-1 (PC-3-1) | −720 B | −40(B) | 0.85(B) | 40(B) |
| Example 3-2 (PC-3-2) | −720 B | −40(B) | 0.85(B) | 40(B) |
| Example 3-3 (PC-3-3) | −720 B | −30(B) | 0.84(B) | 30(B) |
| Example 3-4 (PC-3-4) | −720 B | −30(B) | 0.84(B) | 30(B) |
| Example 3-5 (PC-3-5) | −720 B | −10(B) | 0.82(B) | 10(B) |
| Example 3-6 (PC-3-6) | −720 B | −40(B) | 0.85(B) | 40(B) |
| Example 3-7 (PC-3-7) | −720 B | −40(B) | 0.85(B) | 40(B) |
| Example 3-8 (PC-3-8) | −720 B | −40(B) | 0.85(B) | 40(B) |
| Example 3-9 (PC-3-9) | −720 B | −40(B) | 0.85(B) | 40(B) |
| Comparative 3-1 (PC-3-10) | −720 B | −40(B) | 0.85(B) | 90(C) |

Example(s) of Fourth Embodiment

Next, examples and comparatives of the fourth exemplary embodiment according to the invention will be described in detail.

Example 4-1

(Manufacturing of Copolymerized PC)

A solution prepared by dissolving 74 g of 2,2-bis(4-hydroxyphenyl) propane (bisphenol A) in 550 ml of aqueous sodium hydroxide having a concentration of 6 mass % was mixed with 250 ml of methylene chloride. Then, while the solution was being stirred, phosgene gas was blown into the solution under cooling at 950 ml/min for 15 minutes. Subsequently, the reaction solution was separated in a stand still manner, and a methylene chloride solution of an oligomer having an organic layer of 2 to 4 polymerization degree and a chloroformate group at its molecular terminal was obtained. The obtained oligomer solution was added with methylene chloride, so that the total amount thereof became 450 ml.

Then, a solution prepared by dissolving 24 g of 4,4'-dihydroxy biphenyl (content of trihydroxy biphenyl: 321 mass ppm, content of 3-tert-butyl-4,4'-dihydroxy biphenyl: 49 mass ppm) in 150 ml of aqueous sodium hydroxide having a concentration of 8 mass % (added with 100 mg of hydrosulfite sodium $Na_2S_2O_4$ (0.57 millimol, 0.0044 mol per 1 mol of material biphenol) as an antioxidant) was mixed. This solution was further added with 3.0 g of p-tert-butylphenol as a molecular weight adjuster (aqueous solution of biphenol).

The above oligomer solution was added with the biphenol aqueous solution for mixture. While being vigorously stirred, the mixture was added with 2 ml of triethylamine aqueous solution having a concentration of 7 mass % as a catalyst. Then, while the mixture was continuously being stirred with a temperature maintained at 28 degrees C., interfacial polycondensation was conducted for 1.5 hours. After the reaction, the reaction product was diluted with 1 liter of methylene chloride. Then, the reaction product was cleaned with 1.5 liter of water for two times, with 1 liter of 0.01N acidum hydrochloricum for one time and with 1 liter of water for two times in this order, and a polymer solution was obtained.

Next, a container provided with a baffle having stirring vanes was separately prepared, and 2 liters of methanol was put into the container. While methanol in the container was being sufficiently stirred with the stirring vanes, 1 liter of the above polymer solution was dropped into the container at such a speed as to allow particles to be formed, and flaking processing based on reprecipitation was conducted. After the dropping was over, the stirring was continued for another 10 minutes while the stirring speed was sufficiently maintained. Then, another 2 liters of methanol was put into the container, and the stirring was continued for additional 5 minutes. By filtrating and drying the obtained flake, a copolymerized PC (PC-4-1) for evaluation was prepared.

(Evaluation of Copolymerized PC)

YI of the PC-4-1 in the original form (i.e., in the form of powder) was measured (based on JIS K 7105).

Then, the PC-4-1 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-4-1 was analyzed with ¹H-NMR, and the PC-4-1 was found to be a copolymerized PC represented by the following formula (5).

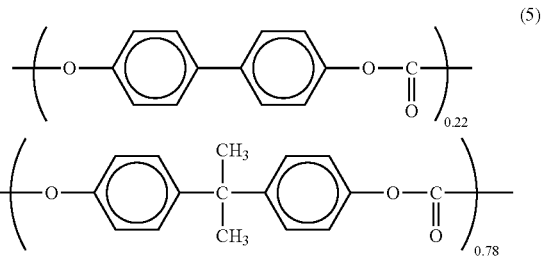

(5)

The flake of the PC-4-1 was melt-extruded with a 50 mm φ short-screw extruder at a cylinder temperature of 280 degrees C. at a screw rotation speed of 100 rpm, and formed into pellets. The pellets were subjected to a drying processing at 120 degrees C. for 5 hours, and subsequently injection-molded with use of a 20×50×3 mm-sized die (S55C Minor Suface #1000) into sample pieces (20×50×3 mm) for use in measurement of solid properties. YI and the overall light transmittance of the sample pieces (injection-molded pieces) were measured based on JIS K 7105. The results were evaluated based on the following criteria.

For YI of the injection-molded pieces: those exhibiting YI of 2 or less were rated as A (excellent); those exhibiting YI of 4 or less were rated as B (good); and those exhibiting YI of more than 4 were rated as C (not good).

For the overall light transmittance: those exhibiting the overall light transmittance of 89% or more were rated as B (good); and those exhibiting the overall light transmittance of less than 89% were rated as C (not good).

(Manufacturing of Electrophotographic Photoreceptor)

An electrophotographic photoreceptor of this example was manufactured in the same manner as the example 1-1 of the first exemplary embodiment. Thus, description therefor will be omitted.

(Evaluation of Electrophotographic Photoreceptor)

The same evaluation as the example 1-1 of the first exemplary embodiment was conducted on the electrophotographic photoreceptor of this example. Thus, description therefor will be omitted.

Example 4-2

In the manufacturing of the copolymerized PC of the example 4-1, the polycondensation was conducted at 15 degrees C. Except for the above, a copolymerized PC (PC-4-2) of the example 4-2 was manufactured in the same manner as the example 4-1. Then, the PC-4-2 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-4-2 was analyzed with $^1$H-NMR, and the PC-4-2 was found to have the same structure as the PC-4-1.

The same evaluation as in the example 4-1 was conducted on the PC-4-2 and an electrophotographic photoreceptor made of the PC-4-2 in the same manner as in the example 4-1.

Example 4-3

In the manufacturing of the copolymerized PC of the example 4-1, the reaction container was replaced by nitrogen gas and oxygen partial pressure was set at 5000 Pa before the polycondensation. Then, the polycondensation was conducted. Except for the above, a copolymerized PC (PC-4-3) of the example 4-3 was manufactured in the same manner as the example 4-1.

Then, the PC-4-3 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-4-3 was analyzed with $^1$H-NMR, and the PC-4-3 was found to have the same structure as the PC-4-1.

The same evaluation as in the example 4-1 was conducted on the PC-4-3 and an electrophotographic photoreceptor made of the PC-4-3 in the same manner as in the example 4-1.

Example 4-4

In the manufacturing of the copolymerized PC of the example 4-1, 24 g of 4,4'-dihydroxy biphenyl (a product having been recrystallized with acetone, content of trihydroxy biphenyl: 8 mass ppm, content of 3-tert-butyl-4,4'-dihydroxy biphenyl: 23 mass ppm) was used as the biphenyl compound for the copolymerization monomer, and the polycondensation was conducted at 15 degrees C. Except for the above, a copolymerized PC (PC-4-4) of the example 4-4 was manufactured in the same manner as the example 4-1. Then, the PC-4-4 was dissolved in methylene chloride to prepare a solution having a concentration of 0.5 g/dl. When reduced viscosity [$\eta_{sp}$/C] thereof at 20 degrees C. was measured, the result was 0.83 dl/g. A chemical structure of the PC-4 was analyzed with $^1$H-NMR, and the PC-4-4 was found to have the same structure as the PC-4-1.

The same evaluation as in the example 4-1 was conducted on the PC-4-4 and an electrophotographic photoreceptor made of the PC-4-4 in the same manner as in the example 4-1.

Example 4-5

In the manufacturing of the copolymerized PC of the example 4-1, 87 g of 1,1-bis(4-hydroxyphenyl) cyclohexane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-4-5) of the example 4-5 was manufactured in the same manner as the example 4-1. Then, the PC-4-5 was dissolved in methylene chloride to prepare a solution having a concentration of 0.5 g/dl. When reduced viscosity [$\eta_{sp}$/C] thereof at 20 degrees C. was measured, the result was 0.83 dl/g. A chemical structure of the PC-4-5 was analyzed with $^1$H-NMR, and the PC-4-5 was found to be a copolymerized PC represented by the following formula (7). The same evaluation as in the example 4-1 was conducted on the PC-4-5 and an electrophotographic photoreceptor made of the PC-4-5 in the same manner as in the example 4-1.

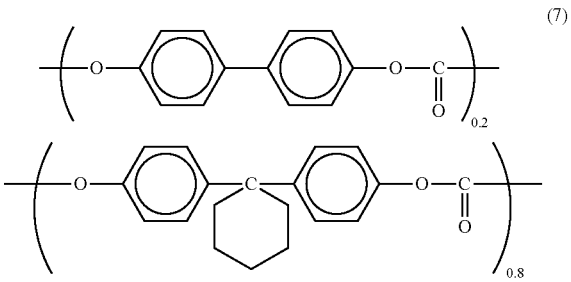

(7)

Example 4-6

In manufacturing the copolymerized PC of the example 4-1, 69 g of 1,1-bis(4-hydroxyphenyl)ethane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-4-6) of the example 4-6 was manufactured in the same manner as the example 4-1. Then, the PC-4-6 was dissolved in methylene chloride to prepare a solution having a concentration of 0.5 g/dl. When reduced viscosity [$\eta_{sp}$/C] thereof at 20 degrees C. was measured, the result was 0.83 dl/g. A chemical structure of the PC-4-6 was analyzed with $^1$H-NMR, and the PC-4-6 was found to be a copolymerized PC represented by the following formula (8). The same evaluation as in the example 4-1 was conducted on the PC-4-6 and an electrophotographic photoreceptor made of the PC-4-6 in the same manner as in the example 4-1.

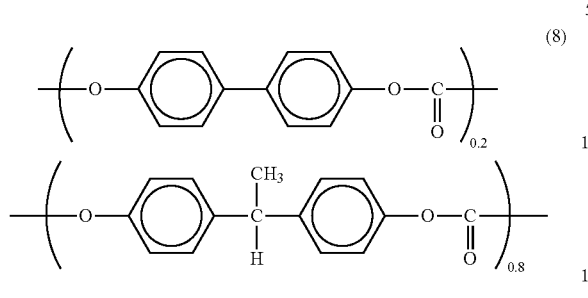

Example 4-7

In manufacturing the copolymerized PC of the example 4-1, 79 g of 2,2-bis(4-hydroxyphenyl) butane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-4-7) of the example 4-7 was manufactured in the same manner as the example 4-1. Then, the PC-4-7 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-4-7 was analyzed with $^1$H-NMR, and the PC-4-7 was found to be a copolymerized PC represented by the following formula (9). The same evaluation as in the example 4-1 was conducted on the PC-4-7 and an electrophotographic photoreceptor made of the PC-4-7 in the same manner as in the example 4-1.

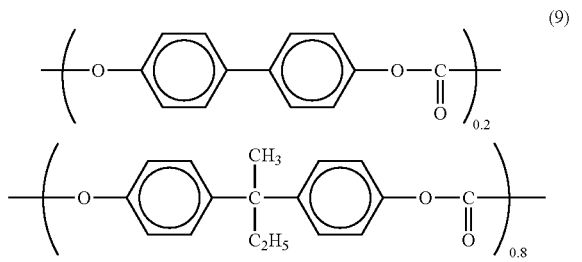

Example 4-8

In manufacturing the copolymerized PC of the example 4-1, 83 g of 2,2-bis(3-methyl-4-hydroxyphenyl) propane was used in place of 74 g of 2,2-bis(4-hydroxyphenyl) propane (bisphenol A) and 550 ml of 1.5N aqueous potassium hydroxide was used in place of 550 ml of aqueous sodium hydroxide having a concentration of 6 mass %. Except for the above, a copolymerized PC (PC-4-8) of the example 4-8 was manufactured in the same manner as the example 4-1. Then, the PC-4-8 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-4-8 was analyzed with $^1$H-NMR, and the PC-4-8 was found to be a copolymerized PC represented by the following formula (10).

The same evaluation as in the example 4-1 was conducted on the PC-4-8 and an electrophotographic photoreceptor made of the PC-4-8 in the same manner as in the example 4-1.

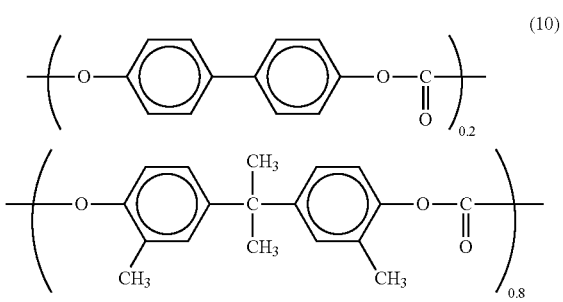

Comparative 4-1

24 g of 4,4'-dihydroxy biphenyl (content of trihydroxy biphenyl: 321 mass ppm, content of 3-tert-butyl-4,4'-dihydroxy biphenyl: 49 mass ppm) was used as the biphenyl compound for the copolymerization monomer. Except for the above, a copolymerized PC (PC-4-9) of the comparative 4-1 was manufactured in the same manner as the example 4-1. Then, the PC-4-9 was dissolved in methylene chloride to prepare a solution having a concentration of 0.5 g/dl. When reduced viscosity [$\eta_{sp}$/C] thereof at 20 degrees C. was measured, the result was 0.82 dl/g. A chemical structure of the PC-4-9 was analyzed with $^1$H-NMR, and the PC-4-9 was found to have the same structure as the PC-4-1.

The same evaluation as in the example 4-1 was conducted on the PC-4-9 and an electrophotographic photoreceptor made of the PC-4-9 in the same manner as in the example 4-1.

[Evaluation Result]

Tables 7 and 8 show evaluation results of the examples 4-1 to 4-8 and the comparative 4-1.

TABLE 7

| | YI of Flake | YI of Injection-Molded Piece | Overall Light Transmittance |
|---|---|---|---|
| Example 4-1 (PC-4-1) | 1.7 | 3 (B) | B |
| Example 4-2 (PC-4-2) | 1.5 | 2 (A) | B |
| Example 4-3 (PC-4-3) | 1.5 | 2 (A) | B |
| Example 4-4 (PC-4-4) | 0.5 | 1 (A) | B |
| Example 4-5 (PC-4-5) | 0.7 | 1 (A) | B |
| Example 4-6 (PC-4-6) | 0.7 | 1 (A) | B |
| Example 4-7 (PC-4-7) | 0.8 | 1 (A) | B |
| Example 4-8 (PC-4-8) | 1.2 | 2 (A) | B |
| Comparative 4-1 (PC-4-9) | 4.1 | 7 (C) | C |

TABLE 8

| | Electrophotographic Photoreceptor | | | |
|---|---|---|---|---|
| | Initial Surface Potential (Vo)(V) | Initial Residual Potential ($V_R$)(V) | Initial Sensitivity ($E_{1/2}$)(lux · sec) | Increase in Residual Potential After Repeated Use ($\Delta V_R$)(V) |
| Example 4-1 (PC-4-1) | −720 B | −20 (B) | 0.83 (B) | 20 (B) |
| Example 4-2 (PC-4-2) | −720 B | −20 (B) | 0.83 (B) | 20 (B) |

TABLE 8-continued

| | Electrophotographic Photoreceptor | | | |
|---|---|---|---|---|
| | Initial Surface Potential (Vo)(V) | Initial Residual Potential ($V_R$)(V) | Initial Sensitivity ($E_{1/2}$)(lux·sec) | Increase in Residual Potential After Repeated Use ($\Delta V_R$)(V) |
| Example 4-3 (PC-4-3) | −720 B | −20(B) | 0.83(B) | 20(B) |
| Example 4-4 (PC-4-4) | −720 B | −10(B) | 0.82(B) | 10(B) |
| Example 4-5 (PC-4-5) | −720 B | −10(B) | 0.82(B) | 10(B) |
| Example 4-6 (PC-4-6) | −720 B | −10(B) | 0.82(B) | 10(B) |
| Example 4-7 (PC-4-7) | −720 B | −10(B) | 0.82(B) | 10(B) |
| Example 4-8 (PC-4-8) | −720 B | −10(B) | 0.82(B) | 10(B) |
| Comparative 4-1 (PC-4-9) | −720 B | −40(B) | 0.85(B) | 90(C) |

The invention claimed is:

1. A polycarbonate copolymer, comprising:
0.1 to 50 mol % of a monomer unit represented by a formula (1) as follows; and
a monomer unit represented by a formula (2) as follows, wherein
a content of biphenols having a structure represented by a formula (3) as follows is 90 mass ppm or less,

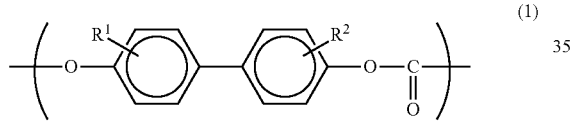
(1)

where $R^1$ and $R^2$ each independently represent a hydrogen atom, an aliphatic hydrocarbon group having 1 to 6 carbon atoms, an aryl group having 6 to 12 carbon atoms or a halogen atom,

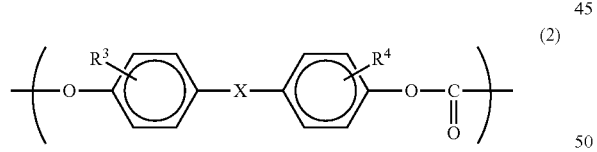
(2)

where: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO$_2$—, —CO—, 9,9-fluorenylidene group and formulae (2a), (2b) (2c) and (2d) as follows,

(2a)

where $R^5$ and $R^6$ each independently represent a hydrogen atom, an aliphatic hydrocarbon group having 1 to 6 carbon atoms or an aryl group having 6 to 12 carbon atoms, $R^5$ and $R^6$ being allowed to be bonded together to form a cycloalkylidene group having 4 to 12 carbon atoms,

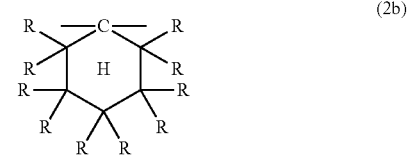
(2b)

where R represents a hydrogen atom or an alkyl group having 1 to 3 carbon atoms, at least one of R representing an alkyl group having 1 to 3 carbon atoms,

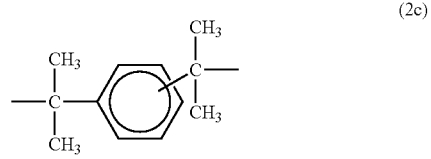
(2c)

where a bonding position is allowed to be any one of o-, m- and p-,

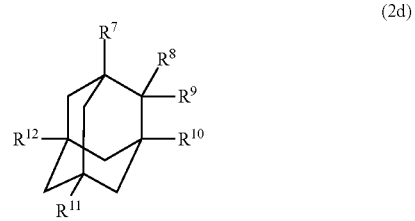
(2d)

where $R^7$ to $R^{12}$ each independently represent a hydrogen atom, an alkyl group having 1 to 4 carbon atoms, or a single bonding or a bonding group formed of an alkylene group, on condition that two of $R^7$ to $R^{12}$ each represent a bonding group while the rest of $R^7$ to $R^{12}$ each represent a hydrogen atom or an alkyl group having 1 to 4 carbon atoms, and

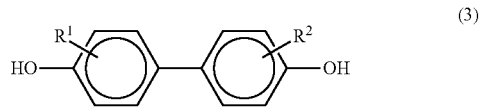
(3)

where $R^1$ and $R^2$ each independently represent a hydrogen atom, an aliphatic hydrocarbon group having 1 to 6 carbon atoms, an aryl group having 6 to 12 carbon atoms or a halogen atom.

2. A polycarbonate copolymer produced by polymerization conducted in a biphasic solvent under the presence of a phase transfer catalyst, the biphasic solvent comprising: a solvent in which 5 mass % or more of a finally-obtained polycarbonate copolymer is soluble, the solvent being substantially non-miscible with water; and an aqueous solution in which alkaline metal hydroxide or alkaline earth metal hydroxide is dissolved, the polycarbonate copolymer comprising:

0.1 to 50 mol % of a monomer unit represented by a formula (1) as follows; and a monomer unit represented by a formula (2) as follows, wherein YI of the polycarbonate copolymer is 3 or less, the YI being produced by measuring flake powder based on JIS K 7105,

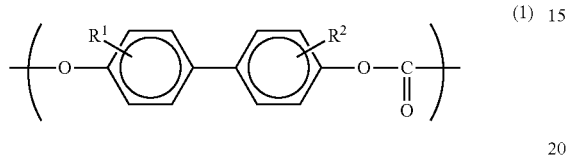
(1)

where $R^1$ and $R^2$ each independently represent a hydrogen atom or an alkyl group having 1 to 3 carbon atoms,

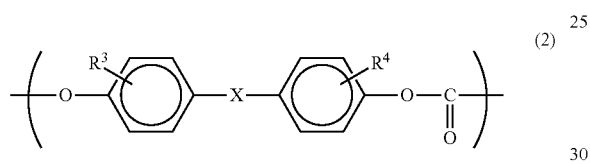
(2)

where: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO$_2$—, —CO—, 9,9-fluorenylidene group and formulae (2a), (2b) (2c) and (2d) as follows,

(2a)

where $R^5$ and $R^6$ each independently represent a hydrogen atom, an aliphatic hydrocarbon group having 1 to 6 carbon atoms or an aryl group having 6 to 12 carbon atoms, $R^5$ and $R^6$ being allowed to be bonded together to form a cycloalkylidene group having 4 to 12 carbon atoms,

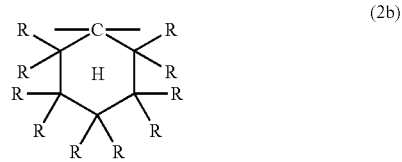
(2b)

where R represents a hydrogen atom or an alkyl group having 1 to 3 carbon atoms, at least one of R representing an alkyl group having 1 to 3 carbon atoms,

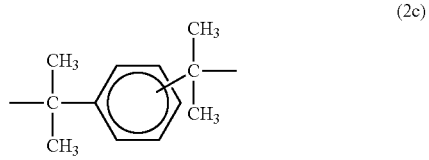
(2c)

where a bonding position is allowed to be any one of o-, m- and p-, and

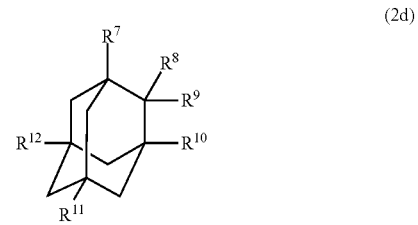
(2d)

where $R^7$ to $R^{12}$ each independently represent a hydrogen atom, an alkyl group having 1 to 4 carbon atoms, or a single bonding or a bonding group formed of an alkylene group, on condition that two of $R^7$ to $R^{12}$ each represent a bonding group while the rest of $R^7$ to $R^{12}$ each represent a hydrogen atom or an alkyl group having 1 to 4 carbon atoms.

3. A molding formed by melt-molding the polycarbonate copolymer according to claim 1.

4. A molding formed by wet-molding the polycarbonate copolymer according to claim 1.

5. An optical material, comprising the polycarbonate copolymer according to claim 1.

6. An optical material, comprising the molding according to claim 3.

7. An optical material, comprising the molding according to claim 4.

8. An electrophotographic photoreceptor, comprising the polycarbonate copolymer according to claim 1.

9. An electrophotographic photoreceptor, comprising the molding according to claim 3.

10. An electrophotographic photoreceptor, comprising the molding according to claim 4.

11. A molding formed by wet-molding the polycarbonate copolymer according to claim 2.

12. An optical material, comprising the polycarbonate copolymer according to claim 2.

13. An electrophotographic photoreceptor, comprising the polycarbonate copolymer according to claim 2.

14. A method of manufacturing a polycarbonate copolymer, comprising:

conducting polycondensation with use of a monomer represented by a formula (3) as follows and a monomer represented by a formula (4) as follows; and adding 0.0001 to 1 mol equivalent of an antioxidant to a reaction system per 1 mol of the monomer represented by the formula (3),

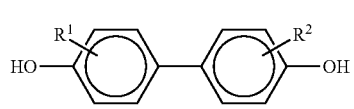 (3)

where $R^1$ and $R^2$ each independently represent a hydrogen atom, an aliphatic hydrocarbon group having 1 to 6 carbon atoms, an aryl group having 6 to 12 carbon atoms or a halogen atom,

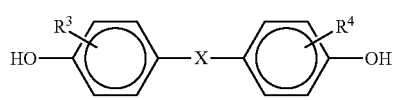 (4)

where: $R^3$ and $R^4$ each independently represent a hydrogen atom, an aliphatic hydrocarbon group having 1 to 6 carbon atoms, an aryl group having 6 to 12 carbon atoms or a halogen atom; and X represents any one of bonding groups represented by —O—, —S—, —SO—, —SO$_2$—, —CO—, 9,9-fluorenylidene group and formulae (2a), (2b) (2c) and (2d) as follows,

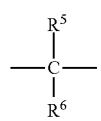 (2a)

where $R^5$ and $R^6$ each independently represent a hydrogen atom, an aliphatic hydrocarbon group having 1 to 6 carbon atoms or an aryl group having 6 to 12 carbon atoms, $R^5$ and $R^6$ being allowed to be bonded together to form a cycloalkylidene group having 4 to 12 carbon atoms,

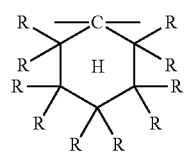 (2b)

where R represents a hydrogen atom or an alkyl group having 1 to 3 carbon atoms, at least one of R representing an alkyl group having 1 to 3 carbon atoms,

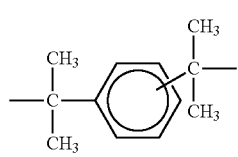 (2c)

where a bonding position is allowed to be any one of o-, m- and p-, and

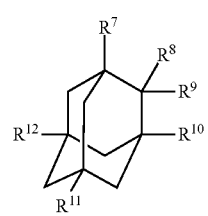 (2d)

where $R^7$ to $R^{12}$ each independently represent a hydrogen atom, an alkyl group having 1 to 4 carbon atoms, or a single bonding or a bonding group formed of an alkylene group, on condition that two of $R^7$ to $R^{12}$ each represent a bonding group while the rest of $R^7$ to $R^{12}$ each represent a hydrogen atom or an alkyl group having 1 to 4 carbon atoms.

15. The method of manufacturing a polycarbonate copolymer according to claim 14, wherein the antioxidant is hydrosulfite salt.

16. The method of manufacturing a polycarbonate copolymer according to claim 14, wherein a temperature at the time of the polycondensation is 20 degrees C. or less.

17. The method of manufacturing a polycarbonate copolymer according to claim 14, wherein the polycondensation is conducted under atmosphere where oxygen partial pressure is 5065 Pa or less.

18. A polycarbonate copolymer manufactured by the method of manufacturing a polycarbonate copolymer according to claim 14.

19. An electrophotographic photoreceptor, comprising the polycarbonate copolymer according to claim 18.

20. The polycarbonate copolymer according to claim 1, wherein three of R each represent an alkyl group having 1 to 3 carbon atoms.

21. The polycarbonate copolymer according to claim 2, wherein three of R each represent an alkyl group having 1 to 3 carbon atoms.

22. The method of claim 14, wherein three of R each represent an alkyl group having 1 to 3 carbon atoms.

* * * * *